United States Patent [19]

Kodera et al.

[11] Patent Number: 4,965,118
[45] Date of Patent: Oct. 23, 1990

[54] FLEXIBLE OPTICAL INFORMATION RECORDING MEDIUM AND METHOD OF MANUFACTURING THE SAME

[75] Inventors: Tokio Kodera, Ota; Nobuaki Kazahaya, Shinjuku, both of Japan

[73] Assignee: Dai Nippon Insatsu Kabushiki Kaisha, Japan

[21] Appl. No.: 219,155

[22] PCT Filed: Oct. 30, 1987

[86] PCT No.: PCT/JP87/00840

§ 371 Date: Aug. 16, 1988

§ 102(e) Date: Aug. 16, 1988

[87] PCT Pub. No.: WO88/03311

PCT Pub. Date: May 5, 1988

[30] Foreign Application Priority Data

Oct. 30, 1986 [JP] Japan .................. 61-259493

[51] Int. Cl.5 .................................... B32B 3/00
[52] U.S. Cl. ...................... 428/137; 428/156;
428/913; 156/233; 264/104; 264/106; 430/495;
430/945
[58] Field of Search ............. 369/272, 285, 286, 287;
428/64, 65, 137, 156, 913; 156/233; 264/104,
106; 430/495, 945

[56] References Cited

U.S. PATENT DOCUMENTS 4,335,173 6/1982 Caraballo ..................... 428/64
4,547,444 10/1985 Bell et al. ..................... 430/945

Primary Examiner—Patrick Ryan
Attorney, Agent, or Firm—Arnold, White & Durkee

[57] ABSTRACT

A flexible resin layer, on the surface of which an uneven pattern corresponding to information to be recorded is formed, and a reflection layer formed on the uneven pattern of the resin layer and having light reflectivity are provided to thereby constitute a flexible optical information recording medium. Further, the resin layer is supported by a flexible supporting layer. For manufacturing such a flexible optical information recording medium, a resin liquid, which can be hardened by irradiation of ultraviolet rays or electron rays, is filled between an ultraviolet ray or electron ray transmissible base film serving as the supporting layer and an uneven pattern original block. Ultraviolet rays or electron rays are then irradiated through the base film to harden and give form to the resin liquid on the base film, thereafter to exfoliate it. For another manufacturing method, a resin layer is formed on an ultraviolet ray or electron ray transmissible base film to form a rolled transfer film. The resin layer surface of the transfer film is pressure-welded onto the surface on which the uneven pattern is formed of the original block while softening the resin layer by heating it so as to transfer the uneven pattern. Ultraviolet rays or electron rays are then irradiated through the base film to harden the resin layer which once has been softened, thus to exfoliate the transfer film from the original block.

36 Claims, 10 Drawing Sheets

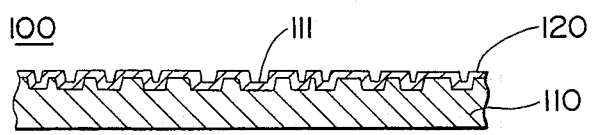
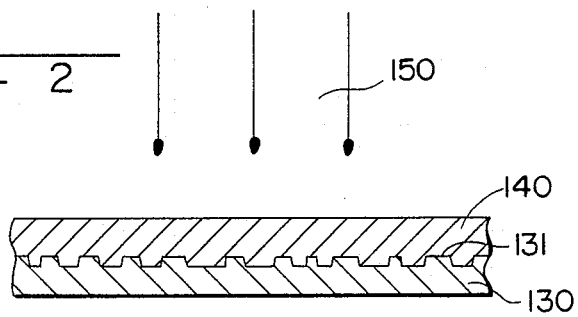
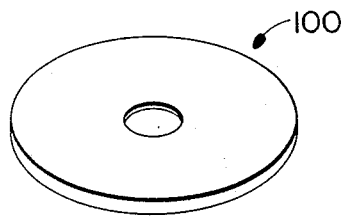
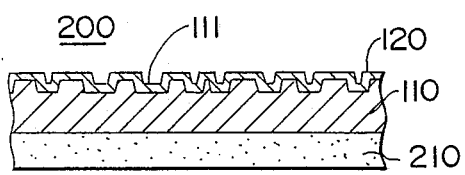
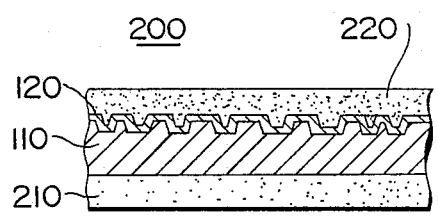

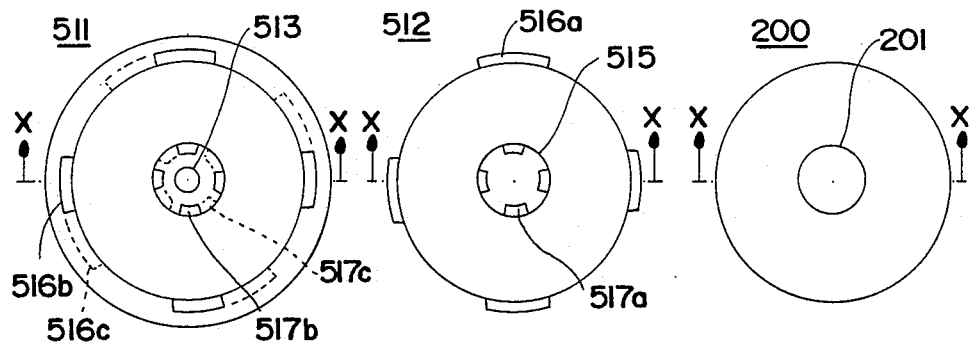
Fig-17A  Fig-17B  Fig-17C
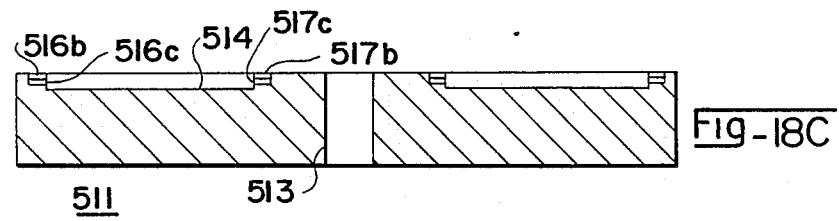
Fig-18A
Fig-18B
Fig-18C
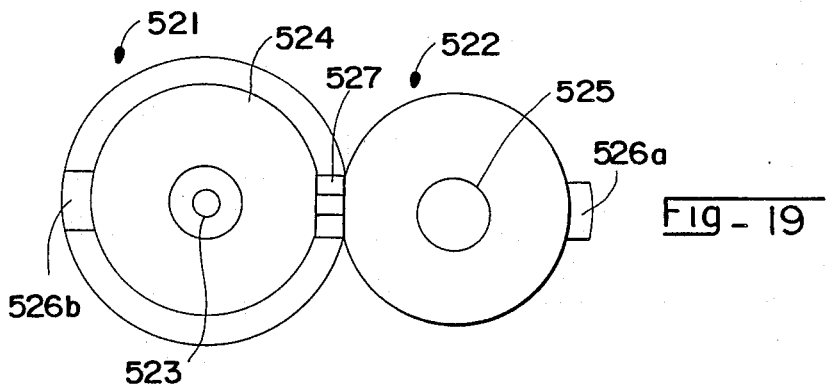
Fig-19

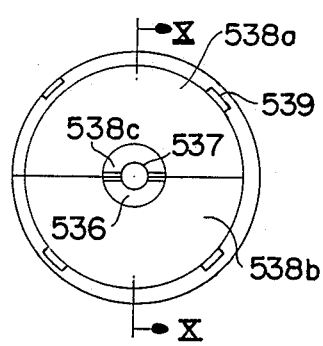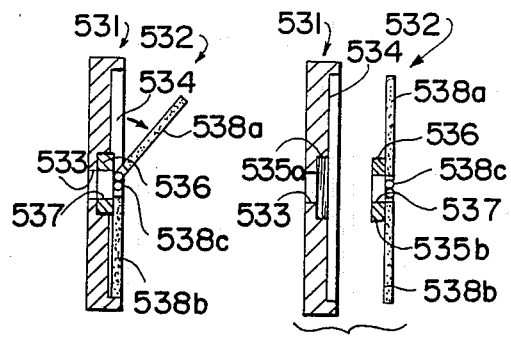
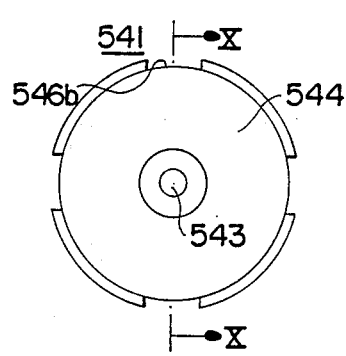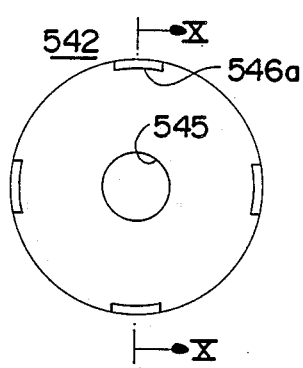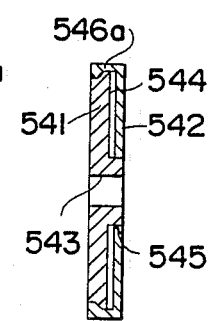
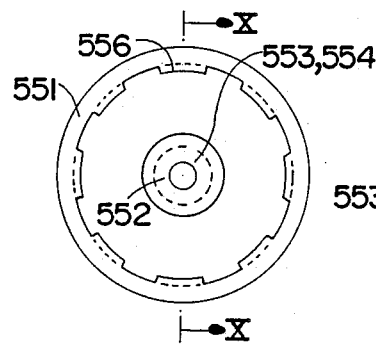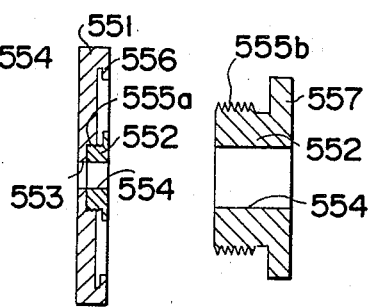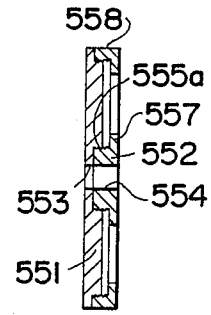

FLEXIBLE OPTICAL INFORMATION RECORDING MEDIUM AND METHOD OF MANUFACTURING THE SAME

TECHNICAL FIELD

This invention relates to a technology to allow flexible optical information recording media, particularly optical disks of the laser-readout type, to have flexibility by thinning them, and to make an improvement such that they are suitable for mass production.

BACKGROUND ART

Optical information recording media represented by optical disks have the following merits as compared to the magnetic information recording media: (1) Recording density is high; (2) Reproduction can be conducted with no contact with the media, with the resultant decreased likelihood of the influence of scratches or dusts; (3) Serious damage does not occur even if they are touched by hand, resulting in easy handling; (4) Readout pick-up only undergoes less consumption; (5) Various reproduction modes are available, and the like, and they have made rapid progress in recent years. For information recorded, there are a wide variety of data used for music, images and/or computers.

In the case of manufacturing recording media only for reproduction, e.g., optical disks, etc., there are employed an injection method or a compression method. In these methods, a metal mold is provided. The metal mold is an original block on which information to be recorded is recorded as an uneven or irregular pattern. In the injection method, resin, e.g., polymethyl methacrylate (PMMA), or polycarbonate (PC), etc. is injected into the metal mold, and in the compression method, resin is compressed to the metal mold. Thus, by repeating resin injection or compression using a metal mold serving as an original block, a great deal of replicas are manufactured.

The conventional prior art as stated above have the following problems.

(1) Since conventional optical disks have a thick, rigid medium, they have a large capacity and take up a broad space, so that they are inconvenient to carry. In addition, broad exhibition space is required at the time of selling.

(2) With the conventional methods of manufacturing optical disks, it is difficult to carry out mass production. As previously described, it is required for the injection method to inject thermoplastic resin into the metal mold vessel under a pressurized condition. On the other hand, with the compression method, it is required to mold-press thermoplastic resin into the metal mold while heating it, and thereafter to remove the resin from the metal mold after the resin is cooled until its temperature is below the thermal deformation temperature. Accordingly, it takes considerable time for replicating one optical disk.

(3) Since a metal mold is exposed to high temperatures in the conventional manufacturing methods for an optical disk, if it is repeatedly used for a long time, its surface is oxidized and thus and uneven pattern is deformed, resulting in lowered reproducibility of information to be recorded.

DISCLOSURE OF THE INVENTION

A first object of this invention is to provide an optical information recording medium which is of the thin type and is flexible so that it is convenient for carrying and/or selling.

A second object of this invention is to provide a manufacturing method and a manufacturing apparatus suitable for mass production of flexible optical information recording media.

A third object of this invention is to provide a reproducing method capable of precisely reproducing a flexible optical information recording medium.

A fourth object of this invention is to provide a special adapter permitting a flexible optical information recording medium to be reproduced with a reproducing device for an ordinary optical information recording medium presently being popularized.

A fifth object of this invention is to provide a method capable of mass-producing recording media equivalent to ordinary optical information recording media presently being popularized by utilizing a flexible optical information recording medium.

(1) The first feature of this invention resides in an optical information recording medium for recording digital information as an uneven pattern corresponding thereto,
wherein there are provided:
a resin layer having flexibility, on the surface of which an uneven pattern corresponding to information to be recorded is formed; and
a reflection layer having light reflectivity formed on the uneven pattern of the resin layer.

(2) The second feature of this invention resides in an optical information recording medium for recording thereto,
wherein there are provided:
a resin layer having flexibility, on the surface of which an uneven pattern corresponding to information to be recorded is formed;
a reflection layer having light reflectivity formed on the uneven pattern of the resin layer; and
a supporting layer formed on a surface opposite to the surface on which the resin layer is formed of the reflection layer, the supporting layer having a function to support the resin layer and having flexibility.

(3) The third feature of this invention resides in a method to use an original block, on which an uneven pattern corresponding to digital information to be recorded is formed, to transfer and mold the uneven pattern of the original block, thereby manufacturing an optical information recording medium,
wherein there are conducted:
painting a resin liquid, which can be hardened or cured by irradiation of ultraviolet rays or electron rays, on the uneven pattern of the original block;
irradiating ultraviolet rays or electron rays onto the painted resin liquid to harden and give form to it; and
exfoliating the hardened resin from the original block.

(4) The fourth feature of this invention resides in a method to use an original block, on which an uneven pattern corresponding to digital information to be recorded is formed, to transfer and mold the uneven pattern of the original block, thereby manufacturing an optical information recording medium:
wherein there are conducted:
filling a resin liquid, which can be hardened or cured by irradiation of ultraviolet rays or electron rays, between a base film through which ultraviolet rays or electron rays are transmissible and the original block;

irradiating ultraviolet rays or electron rays through the base film to harden and give form to the resin liquid on the base film; and exfoliating the base film and the hardened resin layer thereon from the original block.

(5) The fifth feature of this invention resides in an apparatus in which an original block, on which an uneven pattern corresponding to digital information to be recorded is formed, is used to transfer and mold the uneven pattern of the original block, thereby manufacturing an optical information recording medium, wherein there are provided:

film supply means for supplying a wound base film through which ultraviolet rays or electron rays are transmissible;

a replica cylinder on which the original block is fitted so that the uneven pattern is exposed to the outer circumferential surface thereof, rotationally moving in a predetermined direction;

pressing means for pressing the base film supplied from the film supply means onto the uneven pattern surface of the original block fitted on the replica cylinder;

resin liquid adhesion means provided at a position spaced in a direction opposite to the revolving direction of the replica cylinder with respect to the pressing position by the pressing means, and for allowing the resin liquid, which can be hardened by irradiation of ultraviolet rays or electron rays, to be adhered onto the uneven pattern surface of the original block;

irradiation means provided at a position spaced in the revolving direction of the replica cylinder with respect to the pressing position, and for irradiating ultraviolet rays or electron rays to the resin liquid through the base film;

exfoliation means for exfoliating the base film and the resin layer hardened thereon from the original block after form is given to the resin liquid and the resin liquid is hardened on the base film by irradiation conducted by the irradiation means; and winding means for winding the base film and the resin layer which have been exfoliated.

(6) The sixth feature of this invention resides in a method to use an original block, on which an uneven pattern corresponding to digital information to be recorded is formed, to transfer and mold the uneven pattern of the original block, thereby manufacturing an optical information recording medium, wherein there are conducted:

forming, on a film through which ultraviolet rays or electron rays are transmissible, a resin layer comprising a resin, which can be hardened by irradiation of ultraviolet rays or electron rays and has a thermal moldability, thus forming a rolled transfer film;

pressure-welding the resin layer surface of the transfer film onto the surface, on which the uneven pattern is formed, of the original block while softening the resin layer by heating it so as to transfer the uneven pattern;

irradiating ultraviolet rays or electron rays through the base film to harden the resin layer which once has been softened; and exfoliating from the original block the transfer film to which the uneven pattern has been completely transferred.

(7) The seventh feature of this invention resides in an apparatus in which an original block, on which an uneven pattern corresponding to digital information to be recorded is formed, is used to transfer and mold the uneven pattern of the original block, thereby manufacturing an optical information recording medium, wherein there are provided:

film supply means for holding a transfer film, comprising a base film through which ultraviolet rays or electron rays are transmissible, and a resin layer formed on the base film and formed of a resin, which can be hardened by irradiation of ultraviolet rays or electron rays and having thermal moldability, the transfer film being wound to supply it;

a replica cylinder on which an original block is fitted so that the uneven pattern is exposed to the outer circumferential surface thereof and rotationally moving in a predetermined direction;

transfer means for pressure-welding the transfer film supplied from the film supply means onto the uneven pattern surface of the original block fitted on the replica cylinder so that the resin layer surface is in contact with the uneven pattern surface, and for transferring, at the same time, the uneven pattern while heating the resin layer to soften it;

irradiation means for irradiating ultraviolet rays or electron rays through the base film, thus to harden the resin layer which once has been softened; and exfoliation means for exfoliating, from the original block, the transfer film to which the uneven pattern has been completely transferred.

(8) The eighth feature of this invention resides in an information reproducing method by irradiating a read beam to an optical information recording medium on which digital information is recorded as an uneven pattern corresponding thereto and having flexibility, wherein a flat plate-like adapter comprised of a transparent material having rigidity is caused to be in contact with at least the surface to which a read beam is irradiated of a flexible optical information recording medium, thus to irradiating the read beam onto the flexible optical information recording medium through the adapter.

(9) The ninth feature of this invention resides in an adapter used for information reproduction of an optical information recording medium on which digital information are recorded as an uneven pattern corresponding thereto and having flexibility, wherein there are provided:

a lower surface adapter for supporting the lower surface of a flexible optical information recording medium, an upper surface adapter for supporting the upper surface thereof, and connection means for connecting both the adapters for enabling the upper and lower surface adapters to hold the flexible optical information recording medium therebetween.

(10) The tenth feature of this invention resides in a method in which an original block, on which an uneven pattern corresponding to digital information to be recorded is formed, is used to transfer and mold the uneven pattern of the original block, thereby manufacturing an optical information recording medium, wherein an optical information recording medium having flexibility and having a width extremely thinner than the width d of an optical information recording medium which is to be the final product is manufactured, and a transparent and rigid flat plate having a thickness of approximately d is adhered onto at least a surface, on which reading of information is conducted, of the flexible optical information recording medium, thus to provide the final product.

BRIEF DESCRIPTION OF THE DRAWINGS

FIG. 1 is a structural cross-sectional view of a first embodiment of a flexible optical information recording medium according to this invention, FIG. 2 is a view showing an embodiment of a method of manufacturing a flexible optical information recording medium having the structure shown in FIG. 1, FIG. 3 is a perspective view of a flexible optical disk made up by punching a flexible optical information recording medium having the structure shown in FIG. 1, FIGS. 4(a) and (b) are structural cross-sectional views of a second embodiment of a flexible optical information recording medium according to this invention.

DETAILED DESCRIPTION OF THE PREFERRED EMBODIMENTS

§1 First embodiment of flexible medium

1.1 Elementary structure

Figure 5:
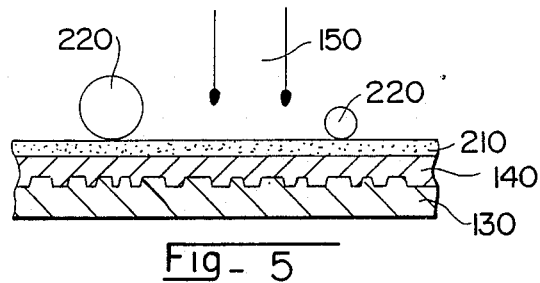
FIG. 5 is a view showing an embodiment of a method of manufacturing a flexible optical information recording medium having the structure shown in FIG. 4.

The structure of a first embodiment of a flexible optical information recording medium according to this invention is shown in FIG. 1. This embodiment applies the invention to an optical disk. A flexible optical disk 100 is comprised of a resin layer 110 and a reflection layer 120. As shown, the reflection layer 120 is formed on an uneven surface 111 formed on the resin layer surface so as to provide a pattern of the same uneven configuration. This uneven pattern corresponds to information to be recorded. By irradiating a laser beam to the reflection layer 120 to observe a reflected light, readout of information is enabled. The resin layer 110 and the reflection layer 120 are both made of a material having flexibility. Thus, the disk 100 has flexibility as a whole.

1.2 Manufacturing method

Most suitable material constituting respective components will be described while explaining a method of manufacturing the disk 100. First, as shown in FIG. 2, a resin mold 130, on which an uneven pattern 131 having an opposite relationship with respect to the uneven pattern corresponding to information to be recorded is formed, is prepared. A resin liquid 140 of the ultraviolet ray hardening type or the electron ray hardening type is painted on the resin mold 130. From the side of the resin liquid 140, ultraviolet rays or electron rays 150 are irradiated, thus to harden and give form to the resin liquid 140. The hardened resin layer serves as the resin layer 110. After this, the resin layer 110 is disconnected from the resin mold 130. When needed, ultraviolet rays or electron rays are irradiated for the second time to complete hardening of the resin. Since the resin thus hardened is subjected to three-dimensional bridging hardening, it exhibits a high heat resistance property and high solvent resistance property.

Subsequently, a metal layer of aluminum, silver, gold, chromium, or nickel, etc. is formed on the uneven surface 111 of the resin layer 110, thus allowing it to serve as reflection layer 120. This may be accomplished by using a deposition, sputtering or plating method, etc. to form a metal layer with the thickness of 500 to 2000 Å.

By allowing the reflection layer 120 and the resin layer 110 thus obtained to be disk-shaped so as to have a desired size by means of punching processing, etc., flexible optical disk 100 is completed as shown in FIG. 3. When needed, a protective layer, etc. may be further formed on the reflection layer 120 with a transparent resin, etc.

For painting or coating of the resin liquid 140, a well known method, e.g., roll coat, knife coat, mere-bar coat, gravure coat, screen printing, dash pouring, or the like, may be used. The thickness of the coating is determined in consideration of the resin hardness after hardening. It is to be noted that ultraviolet rays or electron rays 150 are irradiated from the side of the resin liquid 140 in the example of FIG. 2, but such rays may be irradiated from the side of the resin mold 130 if the resin mold 130 is of an ultraviolet ray or electron ray transmissible type.

The resin mold 130 may be made up, e.g., in a manner described below. First, a photoresist is painted onto a glass plate and exposed by using a mask having a pattern corresponding to information to be recorded, to thus make an original block on which an uneven pattern corresponding to information to be recorded is formed after going through a development process. Resin, e.g., thermoplastic resin, thermosetting resin, ultraviolet ray hardening type resin, electron ray hardening type resin, or the like (i.e., which is not deteriorated by irradiation of ultraviolet rays or electron rays), is painted on the original block and hardened, thereafter disconnecting it from the original block, to thus form resin mold 130. Accordingly, various materials may be used for the resin mold 130 and resin of the same material as that of the resin forming the resin layer 110 may be used.

For the resin of the ultraviolet ray hardening type or the electron ray hardening type, prepolymer and oligomer monomer having an unsaturated molecular bond may be used. For example, a mixture of one kind of unsaturated polyester family, the crylate family, e.g., epoxy acrylate, urethane acrylate or polyether acrylate etc., and the methacrylate family, e.g., epoxy methacrylate, urethane methacrylate, polyether methacrylate, or polyester methacrylate, etc. or two or more kinds thereof and a monomer or functional compound having an unsaturated molecular bond, or mixture into which a sensitizer, etc. are added according to need may be used.

1.3 Embodiments
(Embodiment 1-3-1)

Finally, the results that have been obtained in the actual manufacturing of the optical disk carried out in accordance with the above-mentioned procedure will be described. First, a photoresist is painted on a glass plate to conduct exposure and development processing by using a mask having a predetermined pattern formed thereon, to thus make an original block. Subsequently, an ultraviolet ray hardening type resin liquid (manufactured by Asahi Kasei Kogyo Kabushiki Kaisha, A.P.R.) is painted on the uneven surface of the original block by using the screen printing process so that its thickness is equal to 50 $\mu$m to conduct from the side of the resin liquid irradiation of ultraviolet rays (under a condition of 80 w/cm, distance of 10 cm) by using a super-high pressure mercury lamp to harden the resin liquid to form the resin mold, thereafter to disconnect it from the original block. Then, the ultraviolet ray hardening type resin liquid is painted on the uneven surface of the resin mold so that its thickness is equal to 100 $\mu$m to conduct irradiation of ultraviolet rays under the same conditions as described above, to thus harden the resin liquid to form a resin layer. This resin layer is exfoliated from the resin mold, then aluminum is deposited on the uneven surface of the resin layer at a thickness of 800 Å by using the vacuum deposition process to form the light reflection layer. Further, the sheet obtained through the above described processes is punched to have a predetermined disk shape. Thus, a final flexible optical disk is obtained.

(Embodiment 1-3-2)

Using an electron ray hardening type resin liquid (urethane acrylate (manufactured by Nippon Gosei Kabushiki Kaisha, XP7000B): oligoester acrylate (manufactured by Toa Gosei Kabushiki Kaisha, Aronics M7300)=30:70 weight parts) in place of the ultraviolet ray hardening resin used in the above-described (Embodiment 1-3-1), an optical disk is obtained under the same hardening conditions as that in the (Embodiment 1-3-1) except that electron rays are irradiated under condition of 180 eV and dosage of 10M rad to harden the resin liquid.

1.4 Advantages

In accordance with the first embodiment, the following advantages are obtained.

(1) Because an expensive metal mold is unnecessary, production costs are reduced.

(2) Because cooling time required for thermal molding is unnecessary, manufacturing can be carried out in a short time.

(3) Because there is no possibility that the resin mold is exposed to high temperatures, no thermal deformation of the uneven pattern occurs.

§2 Second embodiment of a flexible recording medium 2.1 Elementary structure

The structure of a second embodiment of a flexible optical information recording medium according to this invention is shown in FIG. 4(a). This embodiment also applies the invention to an optical disk. A flexible optical disk 200 is constituted by further providing a supporting layer 210 in the above-mentioned flexible optical disk 100. Such a supporting layer 210 can improve the physical strength of the disk. In the embodiment shown in FIG. 4(b), a protective layer 220 is further formed on the reflection layer 120. Actually, it is preferable that an optical disk provided with such a protective layer 220 is the final product. In addition, for enhancing close adhesion between supporting layer 210 and resin layer 110, it is preferable to form a primer layer (not shown) comprised of, e.g., an anchor material, etc. on the boundary surface between both of the layers.

2.2 Manufacturing method

An example of a method of manufacturing this flexible optical disk 200 will be described. First, as shown in FIG. 5, the above-mentioned liquid 140 of the ultraviolet ray hardening type or electron ray hardening type is painted on the uneven surface of the resin mold 130, and the surface of the resin liquid 140 is coated with the transparent supporting layer 210, thereafter to irradiate ultraviolet rays or electron rays 150 while pressure-welding the supporting layer 210 and the resin mold 130 by means of a roller 220, etc. under pressure of more than 0.1 Kg/cm$^2$, desirably more than 1 Kg/cm$^2$ according to need. In a manner as stated above, the resin liquid 140 and the supporting layer 210 are hardened so that they are integrated to disconnect them from the resin mold 130. After this, a flexible optical disk can be manufactured in accordance with the same process as that in the above-mentioned first embodiment. Since application of pressure to the resin liquid 140 painted through the support layer 210 can be conducted in accordance with this invention, it is possible to efficiently remove bubbles occurring between the resin liquid 140 and the resin mold 130.

For the supporting layer 210, any material permitting ultraviolet rays or electron rays to be transmitted therethrough, having flexibility and having a certain strength may be used. Actually, a polymerized or copolymerized film of polyethylene terephthalate, polyimide, polymethylmethacrylate, polycarbonate, polyvinyl chloride, polyethylene, polystyrene, polyolefin, and epoxy resin, etc. are suitable. In addition to them, synthetic paper, natural paper, metallic film, glass, and ceramic paper, etc. may be used. The thickness is preferably 25 to 200 $\mu$m, more preferably 75 to 200 $\mu$m. It is to be noted that it is preferable to form a primer layer for enhancing close adhesion on the contact surface of the supporting layer and the resin liquid 140. For example, a film of polyethylene terephthalate may be used as the supporting layer 210 to paint an under lacquer as a primer on the film with the thickness of about 1 to 5 μm. In addition, electric processing, e.g., corona processing, etc. may be implemented on the film to improve adhesiveness. 2.3 Embodiment (Embodiment 2-3-1) Finally, the result has been obtained in the actual manufacturing of the optical disk carried out in accordance with the above-mentioned procedure will be described. First, a photo-resist is painted on a glass plate to conduct exposure and development processing by using a mask having a predetermined pattern formed thereon, to thus make an original block. Subsequently, an electron ray hardening type resin liquid (urethane acrylate [manufactured by Nippon Gosei Kabushiki Kaisha, XP 7000B]: oligoester acrylate [manufactured by Toa Gosei Kabushiki Kaisha, Aronics M 7300]=30:70 weight parts) is painted on the uneven surface of the original block by using the screen printing process so that its thickness is equal to 50 μm. Thereafter, electron rays are irradiated from the side of the resin under a condition of 200 KeV and dosage of 10M rad to thereby harden the resin liquid to exfoliate it from the original block, to thus make a resin mold. Then, an ultraviolet ray hardening type resin liquid having a composition of the Table shown below is painted on the uneven surface of the resin mold so that its thickness is equal to 20 μm. Then, a polyester film with the thickness of 100 μm is coated on the surface of the resin liquid and ultraviolet rays (under a condition of 80 W/cm, distance of 10 cm) are irradiated from the side of the polyester, to thus harden the resin liquid. It is to be noted that an anchor material has been painted in advance on one side of the polyester film so that its thickness is equal to 2 μm to form a primer layer. This primer layer side is in contact with the resin liquid, whereby close adhesion between the polyester film and the resin is enhanced. After the resin layer thus hardened is exfoliated, aluminum is deposited on its uneven surface by the thickness of 800 Å by the vacuum deposition to form a light reflection layer, then it is punched into a disk of a predetermined size. Thus, a final flexible optical disk is obtained.

TABLE

| Composition of ultraviolet ray hardening type resin | 100% Solid |
| --- | --- |
| Epoxyacrylate | 15 parts |
| Polyester acrylate | 38 |
| Aliphatic acrylate | 25 |
| Amine denatured acrylate | 15 |
| Sensitizer | 7 |
| Leveling agent (silicon system) | 1.5 |

(Embodiment 2-3-2)

First, a photoresist is painted on a glass plate to conduct exposure and development processing by using a mask having a predetermined pattern formed thereon, to thus make an original block. Subsequently, an electron ray hardening type resin liquid (urethane acrylate [manufactured by Nippon Gosei Kabushiki Kaisha, XP 7000B]: oligoester acrylate [manufactured by Toa Gosei Kabushiki Kaisha, Aronics M 7300]=30:70 weight parts) is painted on the uneven surface of the original block by using the screen printing process so that its thickness is equal to 50 μm. Then, electron rays are irradiated from the resin side under a condition of 200 KeV and dosage of 10M rad to harden the resin liquid to exfoliate it from the original block to make a resin mold. Then, the above-mentioned electron ray hardening type resin liquid is painted on the uneven surface of the resin mold so that its thickness is equal to 20 μm. Then a polyester film is coated with the thickness of 100 μm on the surface of the resin liquid to irradiate electron rays from the polyester side under the same condition as stated above, to thus harden the resin liquid. It is to be noted that a primer layer has been formed in advance on the polyester film. After the resin layer thus hardened is exfoliated, aluminum is deposited on its uneven surface by the thickness of 800 Å by vacuum deposition to form a light reflection layer, then it is punched so as to be disk-shaped in a predetermined size. Thus, a final flexible optical disk is obtained.

2.4 Advantages

The same advantages as those in the above-mentioned embodiment are obtained also in the second embodiment.

Figure 6:
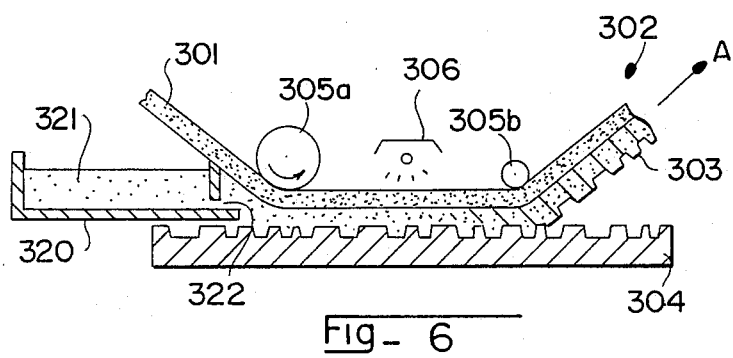
FIG. 6 is a view showing the principle of a form giving process in a first manufacturing method according to this invention suitable for mass production of flexible optical information recording media.

§3 Manufacturing method 1 suitable for mass production of flexible recording media 3.1 Principle of the manufacturing method The recording medium composed of a resin layer 110, reflection layer 120 and support layer 210 is shown in FIG. 4. An embodiment of a manufacturing method suitable for mass production of optical disks having such a structure will be described. FIG. 6 is a view showing the principle of this manufacturing method. First, a light transmissible base film 301 of approximately 100 pm in thickness is carried or conveyed in a direction A in the figure by carrying rollers 305a and 305b. This base film 301 is the material serving as supporting layer 210 in the structure shown in FIG. 4. Between carrying rollers 305a and 305b, a light source for irradiating ultraviolet rays or electron rays is disposed. In the lower direction of the carrying path for the base film 301, a resin mold 304 is arranged with it being spaced by a predetermined spacing (e.g., 1 mm). Such uneven portions to have a relationship opposite to the corresponding information to be recorded are formed on the surface of the resin mold 304 which serves as the original block of the optical disk. At the portion from which the base film 301 is carried into, a resin liquid bath 320 having a discharge opening 322 is provided. The resin liquid 321 within the resin liquid bath 320 is discharged from the discharge opening 322. The resin liquid 321 discharged is filled into a space between the base film 301 and the resin mold 304. These carrying rollers 305a and 305b serve to press the base film 301 onto the uneven surface of the resin mold 304 through the filled resin liquid 321.

For the base film 301, various film-like materials may be used. Actually, a polymerized film of polyethylene, polypropylene, polyethylene terephthalate, polyvinyl chloride, vinyl chloride/vinyl acetate copolymer, polyvinylidene chloride, polymethyl methacrylate, polystyrene, polyvinyl butyral, or polycarbonate, etc., metal film of iron, etc., natural paper, and synthetic paper may be used. Further, laminates of these films may be used. In addition, for the resin liquid hardened by ultraviolet rays or electron rays, resin liquids described in the section §1 may be used. It is to be noted that it is preferable for enhancement of close adhesion to resin to form primer layer comprised of anchor material.

The actual manufacturing process is as follows. First, resin liquid 321 is discharged from the resin liquid bath 320 while carrying the base film 301 on the resin mold 304, to thus fill the resin into the space between the resin mold 304 and base film 301. At the same time, ultraviolet rays or electron rays are irradiated from the irradiation light source 306. Thus, the resin liquid 321 is hardened, resulting in resin layer 303. This resin layer 303 is fixed on the base film 301, onto the surface of which an uneven pattern of the resin mold 304 is transferred. Since the base film 301 is carried in a direction as indicated by an arrow A, the resin layer 303 fixed thereto is exfoliated from the resin mold 304. In this way, film 302 for the disk comprising base film 301 and resin layer 303 is formed. It is to be noted that it is preferable to apply a pressure of more than 0.1 Kg/cm$^2$, preferably more than 1 Kg/cm$^2$ across the base film 301 and the resin layer 304 serving as the original block in the above-mentioned replication process. After the resin layer 303 has been hardened by irradiation of ultraviolet rays or electron rays, the above-mentioned pressure may be released. It is preferable to irradiate ultraviolet rays or electron rays for the second time after the film 302 for the disk has been exfoliated, to thus completely harden the resin layer 303. The dosage of ultraviolet rays or electron rays may be suitably determined on the basis of the resin material used. In addition, since the resin liquid 321 is subjected to three-dimensional bridging hardening by irradiation of ultraviolet rays or electron rays, the resin layer 303 obtained as a result of this exhibits a heat resistance property and solvent resistance property. It is to be noted that the base film 301 and the resin mold 304 may be forcedly cooled in the above-described replication process, but it is sufficient to carry out natural cooling in ordinary cases.

Figure 7:
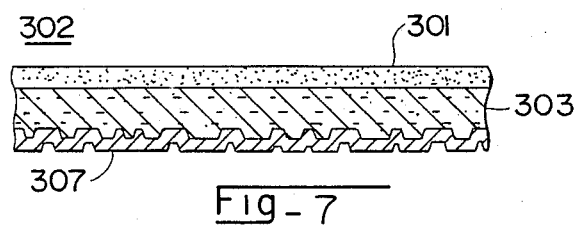
FIG. 7 is a view showing the principle of a reflection layer forming process in the first manufacturing method according to this invention suitable for mass production of flexible optical information recording media.
Figure 8:
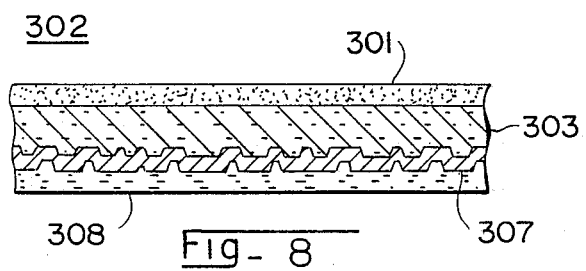
FIG. 8 is a view sowing the principle of a protective layer forming process in the first manufacturing method according to this invention suitable for mass production of flexible optical information recording media.

After the film 302 for the disk has been obtained in a manner stated above, reflection layer 307 as shown in FIG. 7 is formed on the uneven surface thereof. This may be accomplished by using metal such as aluminum to implement the method, e.g., vacuum deposition, sputtering or plating, etc. It is suitable that its thickness is 500 to 1000 Å. In this embodiment, as shown in FIG. 8, a protective layer 308 comprised of a transparent resin is further formed on the reflection layer 307. It is required that this protective layer is such that it prevents degradation of the reflection layer, that strain, e.g., finger print, oil or the like is not likely to be adhered thereto, and that it is resistant to scraping. For this purpose, it is desirable to use an ultraviolet ray hardening type resin or electron ray hardening type resin as the resin constituting this layer. In addition, its thickness is about 2 to 15 μm.

In this way, the film 302 for the disk will be formed of four layers of base film 301, resin layer 303, reflection layer 307, and protective layer 308. By punching the film 302 for the disk by a general punching method so that it has a predetermined size and form or configuration, a flexible optical disk as shown in FIG. 3 is manufactured.

3.2 Embodiment
(Embodiment 3-2-1)

For the base film, a polyester film 100 μm thick is used. A primer layer is formed on one side of the polyester film by painting an acrylic system anchor material with the thickness of 2 μm. Further, for the resin layer, the ultraviolet ray hardening resin used in the above-described (Embodiment 2-3-1) is used as the material. An adjustment is made so that a pressure of 2 Kg/cm$^2$ is applied across the base film and the original block to deliver the base film at a speed of 7 m/min. to irradiate ultraviolet rays (under a condition of 80 W/cm, distance of 10 cm) to harden the resin filled between the base film and the original block to prepare a film on the surface of which an uneven pattern is formed, to thus conduct metal vacuum deposition for reflection layer as previously described. Then, an acrylic system ultraviolet ray hardening resin (manufactured by Dainichi Seika Kabushiki Kaisha, Seika Beam VDAL 383) is painted on the metal vacuum deposition surface so that its thickness is 7 μm to harden it, to thus form a protective layer. After this, by punching this film in a disk shape, an optical disk is obtained.

(Embodiment 3-2-2)

In place of the ultraviolet ray hardening type resin in the above-described (Embodiment 3-2-1), the electron ray hardening type resin in the previously described (Embodiment 2-3-2) is used under the same hardening condition, and the base film speed is 10 m/min. Others are the same as those in the (Embodiment 3-2-1).

3.3 Actual manufacturing apparatus

Figure 9:
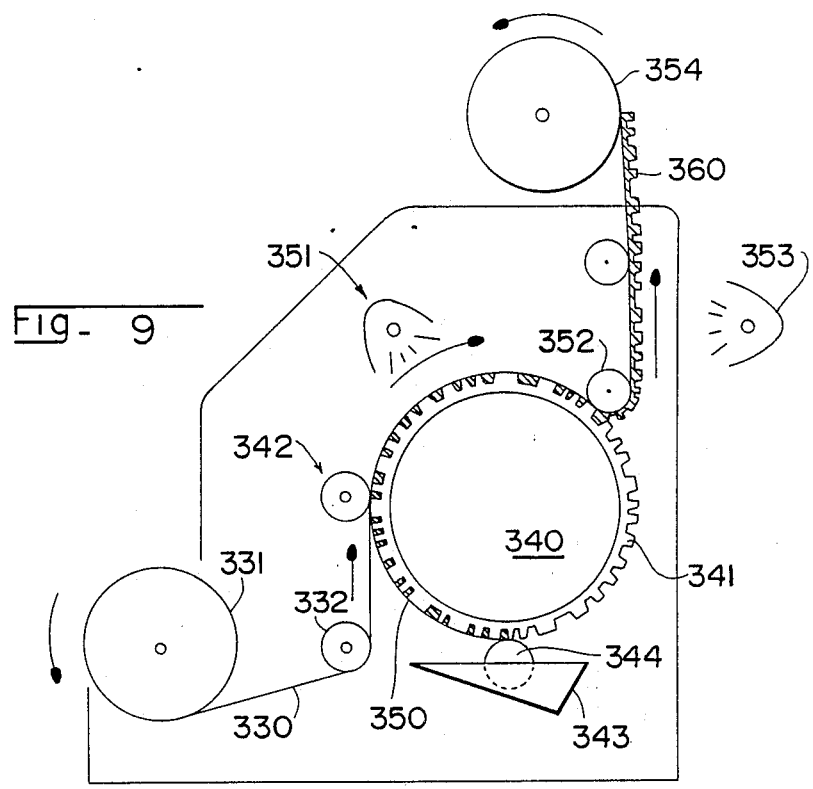
FIG. 9 is a structural view of a manufacturing apparatus for implementing the first manufacturing method according to this invention suitable for mass production of flexible optical information recording media, FIGS. 10(a) and (b) are views showing the principle of a form giving process in a second manufacturing method according to this invention suitable for mass production of flexible optical information recording media.

Subsequently, a manufacturing apparatus capable of mass-producing flexible optical disks on the basis of the above-described principle will be explained. FIG. 9 is a structural view of an embodiment of such an apparatus. A light transmissible base film 330 (corresponding to the above-mentioned base film 301) is wound onto a winding roll 331, and is drawn out by a feed roller 332.

On the other hand, an optical disk original block 341 (corresponding to the above-described resin mold 304), on which uneven portions corresponding to information to be recorded are formed, is circumferentially provided on the surface of a replica cylinder 340. The base film 330 fed out from the feed roller 332 is carried along the circumference of the replica cylinder 340. A nip roller 342 has a function to press the base film 330 onto the surface of the optical disk original block 341.

Below the replica cylinder 340, a resin bath 343 within which a resin liquid 350 hardened by irradiation of ultraviolet rays is contained is disposed. Within the resin bath 343, a painting roller 344 revolving while pressingly being in contact with the surface of a laser disk original block 341 is provided. By this painting roller 344, the resin liquid 350 is painted on the surface of the optical disk original block 341. The resin liquid 350 thus painted is filled into a space between the base film 330 and the optical disk original block 341 by the nip roller 342.

Above the nip roller 342, an ultraviolet lamp 351 is provided to irradiate ultraviolet rays to the resin liquid 350 filled between the base film 330 and the optical disk original block 341. By irradiation of ultraviolet rays, the resin liquid 350 is hardened. The feed roller 352 has a function to exfoliate a film 360 for the disk comprised of base film 330 and resin layer hardened with it being fixed thereto from the optical disk original block 341. To the film 360 for the exfoliated disk, ultraviolet rays are irradiated from the ultraviolet lamp 353 for the second time. Thus, the resin is completely hardened. The winding roller 354 winds the film 360 for the thus formed disk.

The revolving speed of the replica cylinder is synchronous with the carrying speed of the base film 330. Every time the replica cylinder 340 makes one revolution, film 360 for the disk to which the uneven pattern corresponding to at least one sheet of the optical disk is transferred can be obtained. When the same or different plural optical disk patterns are formed on the optical disk original block 341, transfer of uneven patterns corresponding to plural optical disks can be made every time the replica cylinder 340 makes one revolution. Accordingly, when the base film 330 is fed out while continuously revolving the replica cylinder 340, optical disk uneven patterns corresponding to one film or plural films are continuously transferred onto the disk 360 for the disk in accordance with the pattern formed on the optical disk original block 341. By forming the reflection layer and the protective layer on the surface of the film 360 for the thus obtained disk using the well known method and punching it in a disk shape, the object flexible optical disk can be obtained. Alternatively, the film 360 for the disk may be punched in a disk shape, thereafter to form a reflection layer and protective layer.

It is to be noted that the ultraviolet lamp 353 in the above-described embodiment is not necessarily required, but may be provided according to need. Further, where resin of the electron ray hardening type is used, an electron ray irradiation device may be used instead of an ultraviolet lamp. In addition, nip roller 342 may be disposed below replica cylinder 340 to provide such a nozzle to inject the resin liquid 350 in place of painting roller 344.

3.4 Advantages

As just described above, this method can continuously form a resin layer having an uneven pattern on the base film wound, thus facilitating mass production to a large extent. Because resin of the ultraviolet ray or electron ray hardening type is used, a pressure-contact condition can be released immediately after the uneven pattern is transferred. Thus, time required for manufacturing one optical disk is extremely reduced. Moreover, because no heating is required, there is no possibility that the uneven pattern of the laser disk original block is deformed by heat. In addition, the merit with this method is that film for forming optical disk can be preserved with it being wound.

§4 Manufacturing method 2 suitable for mass production of the flexible recording medium 4.1 Principle of the manufacturing method An embodiment of a manufacturing method suitable for mass-producing optical disks comprising a resin layer, reflection layer and support layer has been exhibited in the section §3. Another method will be described in this section. This method is characterized in forming a resin layer using a resin hardened by irradiation of ultraviolet rays or electron rays. Since such a resin has thermal moldability, and therefore, it can be dealt with as a solid at room temperature, it is possible to form the resin layer in advance as a solid layer on the base film prior to replication of the uneven pattern.

Figure 10A:
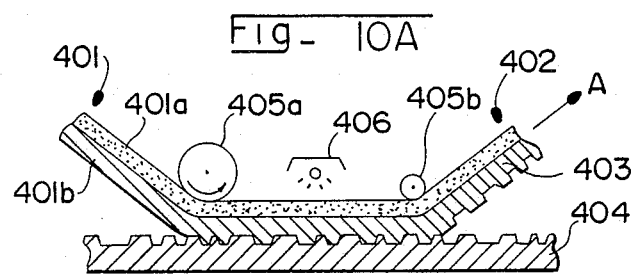

FIG. 10(a) is a view showing the principle of this manufacturing method. A film 401 for the disk is such that a thermally moldable resin layer 401b is formed on a light transmissible base film 401a of approximately 100 $\mu$m in thickness. This resin layer 401b is a resin having thermal moldability and hardened by ultraviolet rays or electron rays. For base film 401a, any film-like material may be used in the same manner as in the embodiment of §3. The resin layer 401b is solid at room temperature, and the film 401 may be wound as one sheet of film and may be preserved with it being wound. This film 401 is carried in a direction A in the figure by a heating and pressure-welding roller 405a and a carrying roller 405b. The heating pressure-welding roller 405a is provided with heating means, thus having a function to pressure-weld the film 401 onto the uneven surface of the resin mold 404 serving as the original block of an optical disk while heating it. It is suitable that the heating temperature of the heating/pressure-welding roller 405a is approximately 50 to 300° C., more preferably 100 to 200° C., although it depends upon the component of resin layer 401b used. In addition, it is suitable that pressure for pressure-welding the film 401 onto the resin mold 404 is approximately 0.1 Kg/cm$^2$, more preferably 1 Kg/cm$^2$. By this heating and pressure-welding, the uneven pattern of the resin mold 404 is transferred onto the surface of the resin layer 401b.

Between the heating/pressure-welding roller 405a and the carrying roller 405b, a light source 406 for irradiating ultraviolet rays or electron rays is disposed. The resin layer 401b deformed by heating is hardened by irradiation of ultraviolet rays or electron rays from the light source 406, resulting in resin layer 403. This resin layer 403 is fixed to the base film 401a, onto the surface of which the uneven pattern of the resin mold 404 is transferred. Since the base film 401a is carried in a direction indicated by an arrow A, the resin layer 403 fixed thereto is exfoliated from the metal mold 404. In this way, film 402 for the disk comprising base film 401a and resin layer 403 is formed. It is preferable that after the film 402 for the disk is exfoliated, ultraviolet rays or electron rays are irradiated for the second time to completely harden the resin layer 403. After this, a reflection layer and protection layer are formed on the resin layer 403 to punch it in a disk shape. Thus, the flexible optical disk as shown in FIG. 3 is manufactured.

The feature of this method resides in that the resin layer 401b is formed in advance as a solid layer on the base film 401a. Thus, transfer of the uneven pattern is enabled by such a process to implement printing to one film. Since the resin layer 401b is heated by heating/pressure-welding roller 405a, but is hardened by undergoing irradiation of ultraviolet rays or electron rays after the uneven pattern has been transferred, it is possible to harden the uneven pattern without cooling. Accordingly, exfoliation from the resin mold 404 is enabled without going through the cooling process.

Figure 10B:
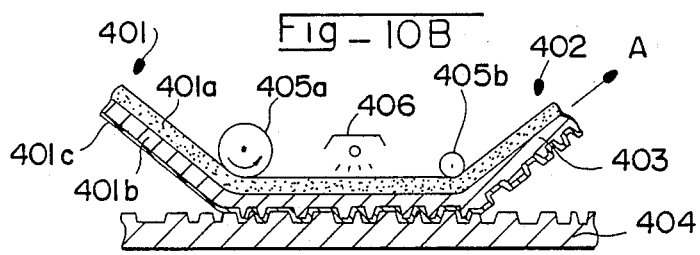

FIG. 10(b) is a view showing the principle of another embodiment. In this method, a reflection layer 401c is formed in advance on the film 401 for the disk. Even in the condition where the reflection layer 401c is thus formed, transfer of the uneven pattern similar to the above can be conducted.

4.2 Embodiment (Embodiment 4-2-1)

Using a polyester film 100 $\mu$m thick as the base film, an acrylic system anchor material is painted so that its thickness is equal to 2 $\mu$m to dry it, to thus form a primer layer. Then, a compound obtained by allowing acrylic acid to react on N-methylol acrylamide polymer is painted on the primer layer so that its thickness is equal to 20 $\mu$m to form a resin layer, to thus prepare a film for emboss replication. Then, this film is delivered at a speed of 3 m/min. to pressure-weld it onto the original block under a condition of a temperature of 110° C. and a pressure of 1 Kg/cm$^2$ to irradiate ultraviolet rays (under a condition of 80 W/cm, distance of 10 cm) thereto to harden the resin, to thus form an uneven pattern on the surface of the film. Metal vacuum deposition is implemented to this film in a manner stated above to form a protective layer, thereafter to punch it to obtain an optical disk.

In addition, by using N-methylol melamine acrylate obtained by reaction of N-methylol melamine and acrylic acid as a resin layer to implement a method similar to the above, a similar optical disk may be obtained.

(Embodiment 4-2-2)

A compound obtained by adding 2, 4-toluene diisocyanate to 3:7 copolymer of butyl methacrylate and 2-hydroxyl ethyl methacrylate is painted on the primer layer of the film used in the above-described (Embodiment 4-2-1) so that its thickness is equal to 20 μm to form a resin layer, to thus prepare a film for emboss replication. Then, this film is delivered at a speed of 10m/min. to pressure-weld it to the original block under a condition of a temperature of 110° C. and a pressure of 1 Kg/cm² to irradiate electron rays (200 Kev, 10M rad) thereto to harden the resin, to thus form an uneven pattern on the surface of the film. Metal vacuum deposition is implemented to this film in a manner as described above to form a protective layer thereafter to punch it, to thus obtain an optical disk.

(Embodiment 4-2-3)

This embodiment is an embodiment in which an optical disk is manufactured in accordance with the principle shown in FIG. 10(b). A reflection layer of aluminum with the thickness of 800 Å is further formed on the film for emboss replication stated in the above-mentioned (Embodiment 4-2-1) using the vacuum deposition to use the film with the provision of a reflection layer as a film for emboss replication. This film is delivered at a speed of 5 m/min. to pressure-weld it to the original block (metal mold) under a condition of a temperature of 160° C. and a pressure of 30 Kg/min. to irradiate ultraviolet rays (under a condition of 80 W/cm and distance of 10 cm) thereto to harden the resin, to thus form an uneven pattern on the surface of the film. After a protective layer is formed on this film, it is punched to obtain an optical disk.

4.3 Arrangement of an actual manufacturing apparatus

Figure 11:
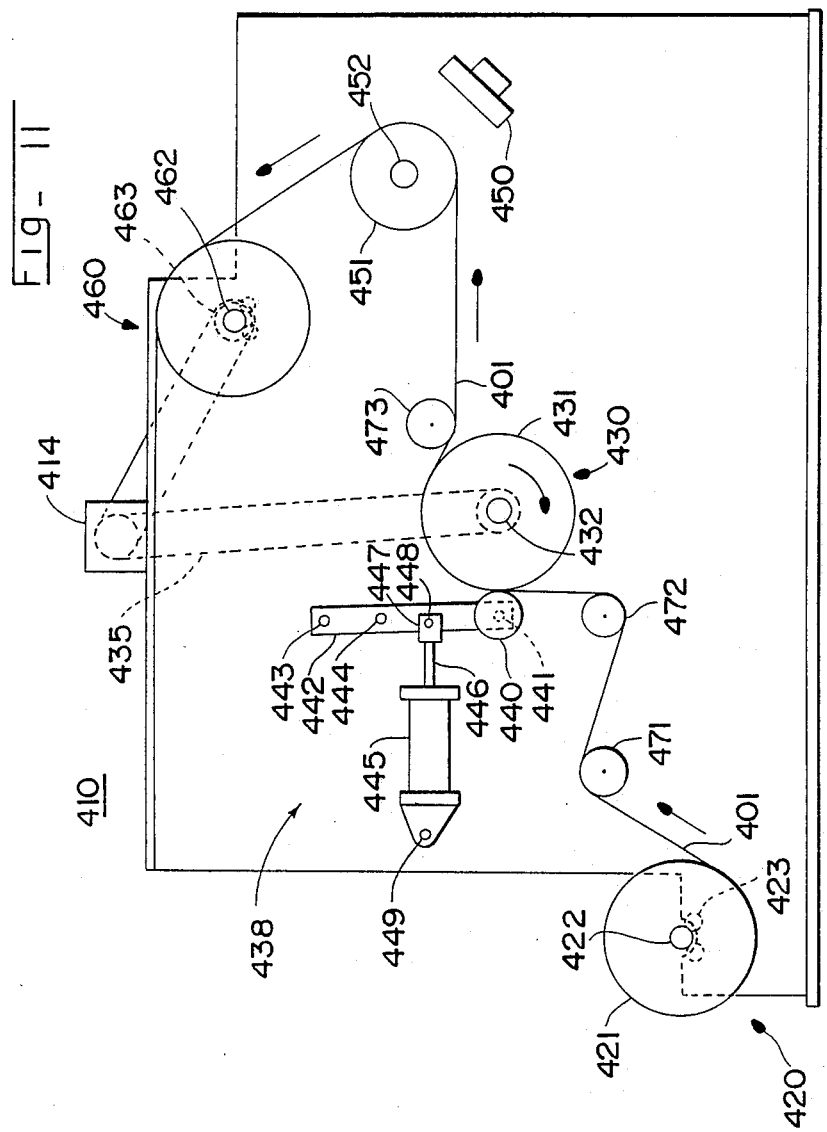
FIG. 11 is a front structural view of a manufacturing apparatus for implementing the second manufacturing method according to this invention suitable for mass production of flexible optical information recording media.
Figure 12:
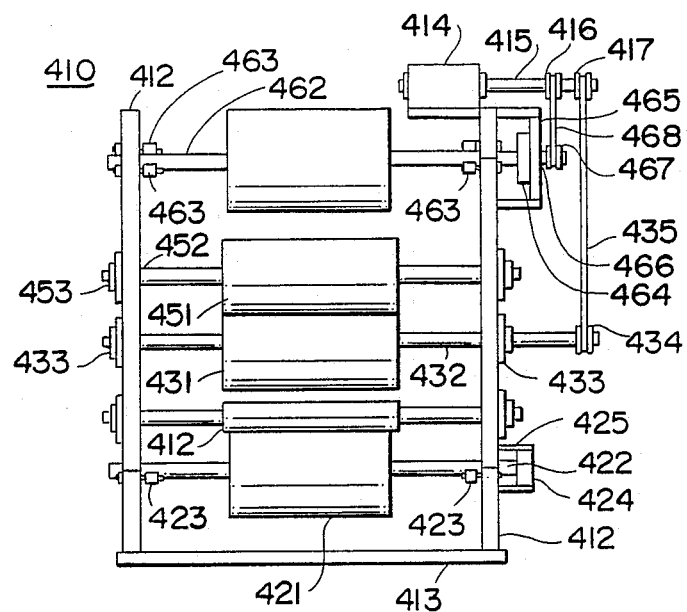
FIG. 12 is a side structural view of the apparatus shown in FIG. 11.

Subsequently, a manufacturing apparatus capable of mass-producing flexible optical disks on the basis of the above-described principle will be explained. FIG. 11 is a front structural view of such an apparatus 410 and FIG. 12 is a side structural view. A pair of body frames 412 are fixed on a bed 413. Within the body frames 412, a paper feed unit 420, a transfer unit 430, an irradiation unit 450, and a winding unit 460 are arranged in order.

(1) The paper feed unit 420 is composed of a shaft 422 rotatably supported by a roller 423 fixed on the body frame 412, and a powder brake 424 fixed on the body frames 412 wherein a winding roller 421 on which film 401 is wound is fitted over the shaft 422. The front end of the shaft 422 is connected to the powder brake 424.

(2) The transfer unit 430 is composed of an emboss roller 431 of which shaft 432 is rotatably supported by a bearing 433 fixed to the central portions of the body frames 412, a pressing roller 440 rotatably supported by a pair of arms 442, and a pressure application mechanism 438. The pressure application mechanism 438 is composed of a pair of arms 442 and an air cylinder 445. To the front end of a piston rod 446 of the air cylinder 445, an attachment 447 is affixed. This attachment 447 is rotatably supported through a pin 448 below the central portion of the arm 442. The air cylinder 445 is rotatably supported by a pin 449 fixed to the body frames 412. A pair of arms 442 is fixedly connected by a rod 444 and is rotatably supported by a pin 443 fixed to the body frames 412. Accordingly, the arm 442 revolves with the pin 443 being a support by the actuation of the piston rod 446 of the air cylinder 445. Thus, the pressing roller 440 is pressed onto the emboss roller 431. It is to be noted that the pressure application mechanism is not limited to the above-described mechanism, but, for example, mechanisms, e.g., hydraulic cylinder, electric motor and mechanical press, etc. may be used.

The pressing roller 440 is equipped with a heater (not shown) and its surface is heated. For such a heater, for example, an electric heater, or steam supply device, etc. provided within the pressing roller 440 may be used, or a far infrared ray heater, etc. provided outside the pressing roller 440 may be used. In addition, in place of heating the pressing roller 440, the emboss roller 431 side may be heated.

Figure 13:
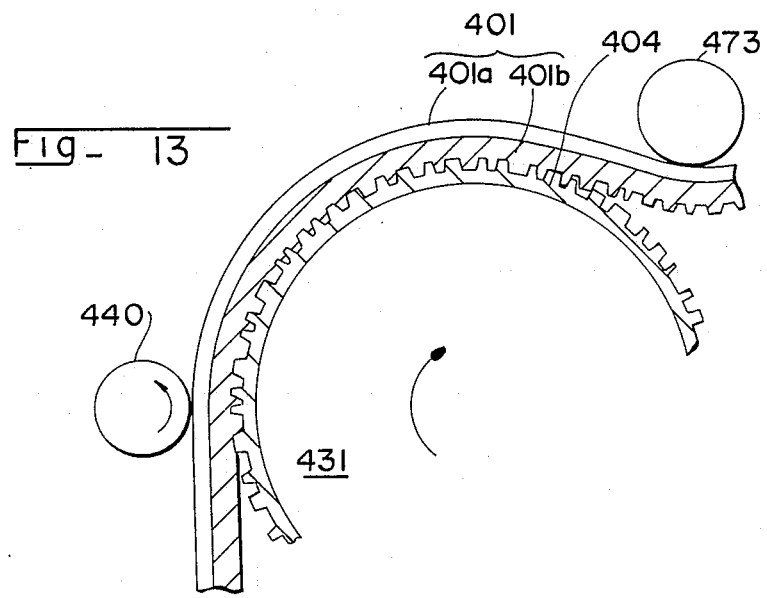
FIG. 13 is a view showing the detail in the vicinity of an emboss roller of the apparatus shown in FIG. 11, FIGS. 14(a) and (b) are views showing problems in the reproduction of the flexible optical information recording medium according to this invention.

The detail in the vicinity of the emboss roller 431 is shown in FIG. 13. On the circumferential surface of the emboss roller 431, the resin mold 404 as the optical original block is provided. Instead of the resin mold 404, a mold of metal, or other material may be used. Further, uneven portions may be directly formed on the circumferential surface of the emboss roller 431 by corrosion or engraving, or plating may be applied to the circumferential surface to form a metal layer, to thus form uneven portions by corroding or engraving the metal layer. On one end of the shaft 432 of the emboss roller 431, a pulley 434 is provided. On a stand 418 provided at the upper portion of the body frame 412, a drive motor 414 is provided. On the front end of the shaft 415 of the drive motor 414, pulleys 416 and 417 are provided. The pulleys 417 and 434 are connected by a belt 435. Eventually, the emboss roller 431 is to be driven in a direction as indicated by an arrow in the figure by the drive motor 414. The circumferential surface of the emboss roller 431 is cooled by a cooling device (not shown). This cooling device may be composed of a rotary joint provided within the shaft 432, a cooling water supply tube, and a cooling water supply unit, etc. It is to be noted that when a heater is provided on the side of the emboss roller 431, such a cooling device is not used.

(3) The film carried out from the emboss roller 431 is wound onto the winding roller 451 rotatably supported by the body frames 412 through the shaft 452 and the bearing 453 and advances in an upper direction in the figure. The irradiation unit 450 is fixed on the body frames 412 by a supporting member (not shown) at the position opposite to the winding roller 451. The film 401, wound onto the winding roller 451, undergoes in turn irradiation of ultraviolet rays or electron rays from the irradiation unit 450. It is to be noted that the irradiation unit 450 does not have a limited arrangement such that it is positioned in the vicinity of the winding roller 451. For example, it may be disposed in the vicinity of the emboss roller 431 to irradiate ultraviolet rays or electron rays under the condition where the film 401 is wound onto the emboss roller 431, or immediately after the film 401 has been exfoliated from the emboss roller 431. In addition, it is preferable to provide a cooling device in association with the winding roller 451, to thus cool the film 401.

(4) The winding unit 460 is composed of a shaft 462 rotatably supported by a roller 463 fixed on the body frames 412, and a powder clutch 464 fixed on the body frames 412 by a supporting member 465. To the input side of the powder clutch 464, a shaft 466 over which a pulley 467 is fitted is connected. The pulleys 467 and 416 are connected by a belt 468. Eventually, the winding unit 460 is rotationally driven by the drive motor 414. Thus, the film 401 is wound.

(5) In addition to the above, guide rollers 471 and 472 rotatably supported by the body frames 412 are provided between the emboss roller 431 and the paper feed unit 420, and a guide roller 473 is provided between the emboss roller 431 and the winding roller 451. The guide roller 473 has a function to determine an angle for winding the film 401 onto the emboss roller 431, and the fitting position thereof varies depending upon the heating temperature, and revolving condition of the emboss roller 431, etc. It is to be noted that a preheater (not shown) may be provided between the emboss roller 431 and the paper feed unit 420 to heat the film 401 in advance, to thus promote or hasten softening of the resin layer 401b conducted between the pressing roller 440 and the emboss roller 431.

4.4 Actual operation of the manufacturing apparatus

The operation of the above-described apparatus is as follows. First, the film 401 drawn out from the paper feed unit 420 is guided to the emboss roller 431 through guide rollers 471 and 472. At this time, a suitable tension is applied to the film 401 by the powder brake 424.

Subsequently, the pressing roller becomes operative by the actuation of the air cylinder 445. Thus, the film 401 is pressed onto the emboss roller 431 at a predetermined pressure. Since the surface of the pressing roller 440 is subjected to heating, the resin layer 491b is softened. Thus, the uneven pattern of the resin layer 404 as the optical disk original block is transferred onto the resin layer 401b. The resin layer 401b on which such an uneven pattern is formed is carried in a direction shown by an arrow in the figure along the circumferential surface of the emboss roller 431 and is exfoliated from the resin mold 404 in the vicinity of the guide roller 473. At this time, since the surface of the emboss roller 431 is subjected to cooling, the resin layer 401b in a softened state is exfoliated with it being solidified to some extent, resulting in no possibility that the uneven pattern transferred is deformed.

The film 401 sent out from the emboss roller 431 is guided to the winding roller 451, at which it is subjected to irradiation of ultraviolet rays or electron rays from the light source 450, so that the resin layer 401b is completely hardened. It is to be noted that since the winding roller 451 is subjected to cooling as described above, the production of heat from the film 401 can be prevented by irradiation of ultraviolet rays or electron rays, resulting in thermal contraction thereof.

Finally, the film 401 is wound onto the shaft 462. At this time, since tension is applied to the film 401 by the powder clutch 464, uniform winding can be conducted.

In this way, film 401 for the disk on which the uneven pattern is formed is obtained with it being in a roll-shape. After this, as described in §3, by punching it in a disk shape to form a reflection layer and protective layer, the flexible optical disk is manufactured.

4.5 Advantages

This method advantageously eliminates a need to use a liquid-state resin in addition to the merits obtained with the method described in the §3.

Further, the method using the principle shown in FIG. 10(b) provides additional advantages.

(1) Since the reflection layer is formed in advance, the process for depositing the reflection layer after the uneven pattern is transferred becomes unnecessary, resulting in a simplified manufacturing process.

(2) Since the reflection layer is formed, heat is radiated from the reflection layer to a great extent, with the result that cooling time after the uneven pattern is formed is reduced. A further advantage is that the reflection layer functions as a protective layer in the process for forming an uneven pattern.

(3) With the method to deposit a reflection layer after the transfer of a pattern, there is the drawback that information bits are degraded at the time of deposition. However, such a drawback is not encountered with this method.

4.6 Actual material for resin layer

In the above-described method, it is required to form in advance a resin layer having thermal moldability and hardened by irradiation of ultraviolet rays or electron rays on the base film. For such materials, there are thermally moldable materials having radical polymerization unsaturated group described below.

(1) Materials having radical polymerization unsaturated group in a polymer of which the glass transition temperature is 0 to 250° C. More particularly, materials obtained by introducing a radical polymerization unsaturated group into polymers obtained by polymerizing or copolymerizing compounds (i) to (viii) recited below in accordance with methods (a) to (d) which will be described later.

(i) Monomer having hydroxyl group: N-methylol acrylamide, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyn, 3-phenoxypropyl methacrylate, and 3-phenoxypropyl acrylate, etc.

(ii) Monomer having carboxyl group: acrylic acid, methacrylic acid, and acryloyloxyethyl monosuccinate, etc., (iii) Monomer having epoxy group: glycydyl methacrylate, etc.

(iv) Monomer having aziridinyl group: 2-aziridinylethyl methacrylate, and 2-aziridinyl propionic acid aryl, etc.

(v) Monomer having amino group: acrylamide, methacrylamide, dyacetone acrylamide, dimethylaminoethyl methacrylate, and diethylaminoethyl methacrylate, etc.

(vi) Monomer having sulfonic group: 2-acrylamide-2-methylpropanesulfonic acid, etc.

(vii) Monomer having isocyanate group: Addition product of diisocyanate such as 1:1 mol addition product of 2, 4-toluenediisocyanate and 2-hydroxyethyl acrylate and radical polymerization monomer having active hydrogen, etc.

(viii) In addition, for adjusting the glass transition point of the above-mentioned copolymer, or adjusting properties of the hardening film, copolymerization of the above-mentioned compounds and monomers polymerizable with these compounds, which will be described below, can be conducted. For such polymerizable monomers, for example, methyl methacrylate, methyl acrylate, ethyl acrylate, ethyl methacrylate, propyl acrylate, propyl methacrylate, butyl acrylate, butyl methacrylate, isobutyl acrylate, isobutyl methacrylate, t-butyl acrylate, t-butyl methacrylate, isoamyl acrylate, isoamyl methacrylate, cyclohexyl acrylate, cyclohexyl methacrylate, 2-ethylhexyl acrylate, N-methylol melamine acrylate, and 2-ethylhexyl methacrylate, etc. are exemplified.

By reacting polymers obtained as stated above in accordance with the methods (a) to (d) described below to introduce a radical polymerization unsaturated group, the material according to this invention can be obtained.

(a) In the case of a polymer or copolymer of a monomer having a hydroxyl group, a monomer having carboxyl group such as acrylic acid or methacrylic acid is subjected to a condensation reaction.

(b) In the case of a polymer or copolymer of a monomer having a carboxyl group or sulfone group, the above-described monomer having a hydroxyl group is subjected to a condensation reaction.

(c) In the case of a polymer or copolymer having an epoxy group, isocyanate group or azylizinyl group, the above-mentioned monomer having hydroxyl group or monomer having a carboxyl group is subjected to an addition reaction.

(d) In the case of polymer or a copolymer having a hydroxyl group or carboxyl group, 1:1 mol addition product of a monomer having an epoxy group, monomer having azylizinyl group, or diisocyanate compound and acrylic acid ester monomer including hydroxyl group is subjected to an addition reaction.

It is preferable to add a bit of polymerization inhibitor such as hydroquinone to carry out the above-mentioned reaction while feeding dry air.

(2) Other materials which can be used in the present invention for resin having thermal moldability are compounds having a melting point of 0 to 250° C radical polymerization unsaturated group. Actually, stearyl acrylate, stearyl methacrylate, triacrylisocyanate, cyclohexanediol diacrylate, cyclohexanediol dimethacrylate, spiroglycol diacrylate, and spiroglycol dimethacrylate, etc. are exemplified.

In this invention, mixtures of materials in the above-mentioned paragraphs (1) and (2) may be used, and a radical polymerization unsaturated monomer may be further added thereinto.

Such radical polymerization unsaturated monomer improves bridging density and heat resistance property at the time of irradiation of ionized radiation. In addition to the above-mentioned monomers, ethyleneglycol diacrylate, ethyleneglycol methacrylate, polyethyleneglycol diacryalte, polyethyleneglycol dimethacrylate, hexanediol diacrylate, hexanediol dimethacrylate, trimethylol propane triacrylate, trimethylol propane trimethacrylate, trimethylol propane diacrylate, trimethylol propane dimethacrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, ethyleneglycol diglycidylether diacrylate, ethyleneglycol diglycidylether dimethacrylate, polyethyleneglycol diglycidylether diacrylate, polyethylene glycol diglycidylether dimethacrylate, propylene glycol diglycidylether diacrylate, propylene glycol diglycidylether dimethacrylate, polypropylene glycol diglycidylether acrylate, polypropylene glycol diglycidylether dimethacrylate, sorbitol tetraglycidylether tetraacrylate, and sorbitol tetraglycidylether tetramethacrylate, etc. may be used. It is preferable to use them with 0.1 to 100 parts by weight with respect of 100 parts by weight of a solid component of the copolymer mixtures. The above-mentioned materials can be sufficiently hardened by electron rays, and in the case of hardening them by ultraviolet rays, materials which produce a radical by irradiation of ultraviolet rays, for example, benzoin ether family, e.g., benzoquinone, benzoin, benzoin methylether, etc. for sensitizer, halogenated acetophenone family, and biatyl family, etc. may be used.

4.7 Another method for softening the resin layer

While softening of the resin layer is carried out by heat in the above-described embodiment, a softening method using an organic solvent may be further used along therewith. In this case, for example, ether system solvents, e.g., tetrahydrofran, diethylether and methylether, etc. having a low boiling point may be vaporized to react these solvents on the resin layer, to thus soften it. In addition, when the resin layer is sufficiently softened only by an organic solvent, only softening means using organic solvent may be adapted without commonly using the softening means by heat.

§5 Method of reproducing flexible recording medium 5.1 Fundamental principle

Figure 14A:
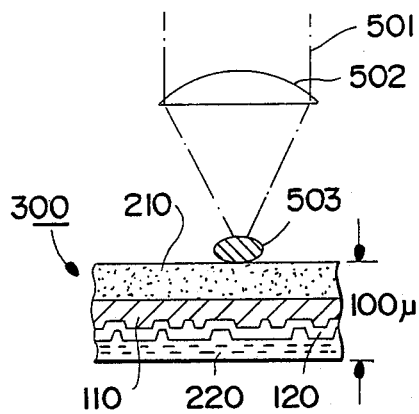
Figure 14B:
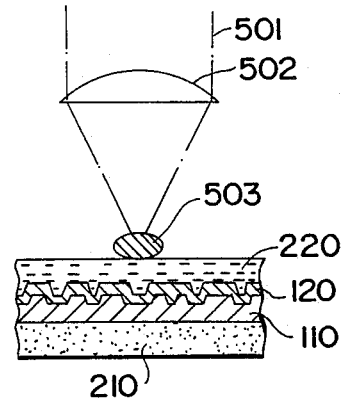

In the §1 to 4, the flexible optical disk and the manufacturing method therefor have been described. Such a flexible optical disk has a thickness of approximately 100 μm at the most. Therefore, when used as it is, it is difficult to reproduce information with high efficiency. Such a circumstance is shown in FIGS. 14(a) and (b). These views show that a laser beam 501 is focused and irradiated onto the flexible optical disk 200 constructed as shown in FIG. 4 using a lens 502, whereby reproduction is being carried out. FIGS. 14(a) and (b) show that laser beam 501 is irradiated from the surfaces opposite to each other, respectively. If a very small adhesive material such as dust or rubbish exists on the surface of the optical disk 200, the laser beam does not reach the uneven surface of the reflection layer 120, failing to read out information recorded.

Figure 15:
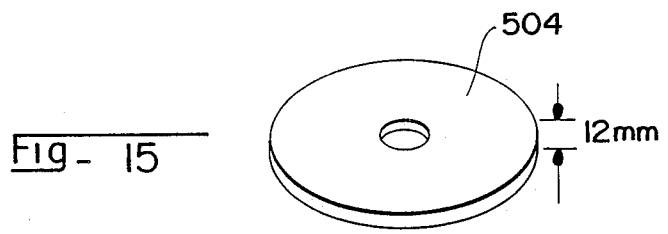
FIG. 15 is a perspective view of an adapter according to this invention, which can be used for reproducing a flexible optical information recording medium, FIGS. 16(a) and (b) are views showing a manner of reproduction of a flexible optical information recording medium according to this invention by using the adapter shown in FIG. 15, FIGS. 17 to 25 are views showing actual structure of an adapter according to this invention, which can be used for reproducing a flexible optical information recording medium.
Figures 16A, 16B:
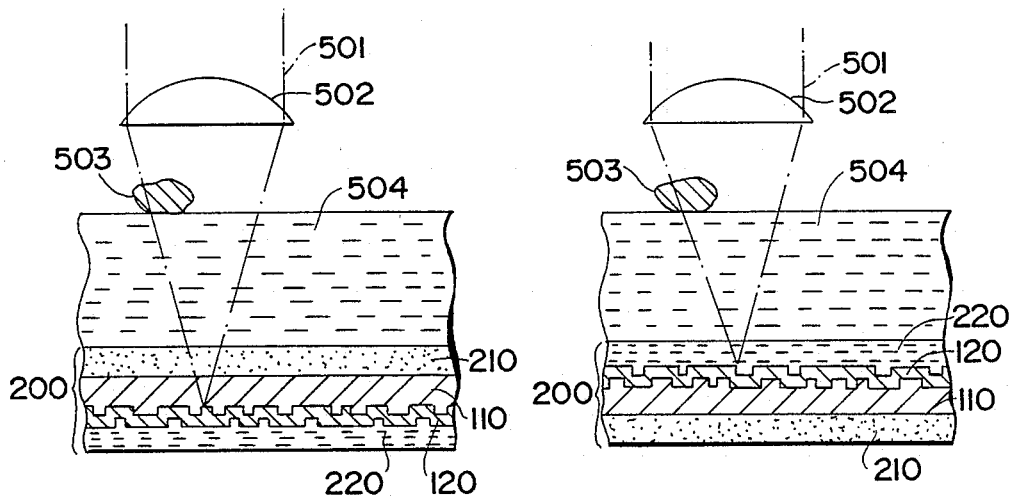

For this countermeasure, as shown in FIG. 15, an adapter 504 having substantially the same size and the same shape as the optical disk 200 is prepared to place the adapter 504 on the reading surface of the optical disk 200 as shown in FIG. 16, to thus conduct reading. For the adapter 504, a member of, e.g., a transparent material having the thickness of approximately 1.2 mm, or the like may be used. The adapter 504 is much thicker than the flexible optical disk 200. Accordingly, as shown in FIGS. 16(a) and (b), even if a very small adhesive material 503 exists on the surface, since laser beam 501 is not completely converged at this position, there is no possibility that reading is impossible even if a portion thereof is screened by the adhesive material 503. FIG. 16(a) shows that the adapter 504 is caused to be in contact with the supporting layer 210 side, whereas FIG. 16(b) shows that the adapter 504 is caused to be in contact with the protective layer 220 side. It is to be noted that any supporting layer 210 may be used in the case of reproduction using the method as shown in FIG. 16(b), but the supporting layer 210 is required to have a small optical distortion (double refractive property) in the case of reproduction using the method as shown in FIG. 16(a).

It is further to be noted that when the adapter 504 has the same shape and the same size as the optical disk 200, this is convenient to handle, but it is not necessarily required to do so. If the adapter 504 is sufficiently thicker than the optical disk 200, an adapter of any size may be adopted. Because the thickness of the optical disk presently on the market is 1.2 mm, it is desirable that the thickness of the adapter 504 is equal to a value near 1.2 mm. However, when the thickness ranges from approximately 0.8 to 1.4 mm, reproduction can be conducted using ordinary reproducing equipment on the market. For material of the adapter 504, transparent materials, e.g., acryl, glass, polyester, epoxy, polycarbonate, and polymethyl methacrylate may be used. In sum, any material having high transparency, less optical distortion (double refraction), small changes in dimension, and excellent abrasion resistance property may be used.

In the embodiment shown in FIG. 16, reproduction is conducted with the adapter 504 being mounted only on the upper surface of the optical disk 200. In addition, an arrangement such that a similar adapter is further in contact with also the lower surface thereof to hold the optical disk 200 between a pair of adapters is more practical. For example, there may be employed an arrangement comprising an upper adapter approximately 1.2 mm thick, a lower adapter approximately 0.4 mm, and an optical disk 200 approximately 100 μm thick held therebetween. When upper and lower surface adapters are used to hold the optical disk by the adapters from both the sides as stated above, curvature and/or deformation of the disk can be suppressed, and surface vibration and/or eccentricity can be prevented, so that high accuracy reproduction can be conducted.

5.2 Actual structure of the adapter

Examples of actual structure of such adapter will be described.

(1) An example shown in FIG. 17 is such that a flexible optical disk 200 shown in FIG. 17(c) is held between a lower surface adapter 511 shown in FIG. 17(a) and an upper surface adapter 512 shown in FIG. 17(b). FIG. 18 is a cross-sectional view showing these components cut along the cutting-plane lines X—X, respectively. The lower surface adapter 511 is a disk having the thickness of approximately 1.4 mm and is provided in the central portion thereof with a through-hole 513. An annular recessed floor 514 is formed on the upper surface of the lower surface adapter 511, and the flexible optical disk 200 may be accommodated within the annular recessed floor 514. A through-hole 201 is formed in the disk 200. This through-hole 201 is supported by the inner circumferential wall of the annular recessed floor 514, whereby secure positioning is conducted. On the other hand, the upper surface adapter 512 has a through-hole 515 in the central portion thereof, and is provided with a plurality of holding pawls 516a and 517a equidistantly arranged at the outer and inner circumferential portions, respectively. Fitting recessed portions 516b and 517b into which fitting pawls 516a and 517a are fitted, and cut grooves 516c and 517c adjoining them in the same plane are formed in the lower surface adapter 511. The fitting recessed portions 516b and 517b are opened upwardly. When the upper surface adapter 512 is mounted on the lower surface adapter 511, holding pawls 516a and 517a can be accepted. The cut grooves 516c and 517c have space communicating with the fitting recessed portions 516b and 517b, but are not opened upwardly. Accordingly, by rotationally moving the upper surface adapter 512 in a direction such that holding pawls 516a and 517a are inserted into the cut grooves 516c and 517c with the upper surface adapter 512 being mounted on the lower surface adapter 511, the holding pawls 516a and 517b are fitted into the cut grooves 516c and 517c. Thus, the upper surface adapter 512 is fixed onto the lower surface adapter 511. In contrast, by rotationally moving the upper surface adapter 512 in an opposite direction, it can be detached for the second time.

In this way, the flexible optical disk 200 can be held by the adapters. The size and shape of the adapters holding the disk therebetween are substantially the same as those of optical disks on the market. Thus, reproduction can be conducted using general reproducing equipment.

(2) An embodiment shown in FIG. 19 is of a structure such that lower and upper surface adapters 521 and 522 are connected by a hinge 527. A through-hole 523 is provided in the central portion of the lower surface adapter 521, and an annular recessed floor 524 for accommodating the flexible optical disk 200 therein is provided on the upper surface thereof. A through-hole 525 is formed also in the center of the upper surface adapter 522. It is possible to raise the upper surface adapter 522 upwardly in the figure with the hinge 527 being as an axis to cover it over the lower surface adapter 521. A holding pawl 526a is fitted into a fitting portion 526b and is held thereat. Accordingly, by mounting the flexible optical disk 200 on the annular recessed floor 524 to cover the upper surface adapter 522 over the lower surface adapter 521 to hold it thereat, reproduction can be conducted using a reproducing equipment on the market in the same manner as in the above described embodiment.

(3) An embodiment shown in FIG. 20 is of a structure in which lower and upper surface adapters 531 and 532 are screw-threadedly connected. FIG. 20(a) is a plane view thereof and FIGS. 20(b) and (c) are side cross-sectional views when the adapter shown in FIG. 20(a) is cut along the cutting-plane lines X—X. FIG. 20(b) shows that both the adapters are screw-threadedly connected and FIG. 20(c) shows that both the adapters are separated from each other. The lower surface adapter 531 is provided with a through-hole 533 and an annular recessed floor 534. A screwed surface 535a is formed in the vicinity of the outer circumference of the through-hole 533. The upper surface adapter 532 is provided with a central member 536 and cover plates 538a and 538b connected thereto by means of a hinge (not shown). A through-hole 537 is formed in the central portion of the central member 536 and a screwed surface 535b is formed on the outer circumferential surface thereof. Since the screwed surface 535b is screw-threadedly connected to the screwed surface 535a, the upper surface adapter 532 can be fixed to the lower surface adapter 531 by means of screw as shown in FIG. 20(b). Since the cover plates 538a and 538b are fixed by means of a hinge, they can be opened as indicated by an arrow in FIG. 20(b). A plurality of holding pawls 539 (see FIG. 20(a)) are provided around the cover plates 538a and 538b. Using this holding pawl 539, the cover plates 538a and 538b are held by the lower surface adapter 531.

(4) An embodiment shown in FIG. 21 is such that flexible optical disk 200 is held by a lower surface adapter 541 shown in FIG. 21(a) and an upper surface adapter 542 shown in FIG. 21(b) therebetween. FIG. 21(c) shows that both the adapters are fitted with each other, which corresponds to the side cross-sectional view when the adapters shown in FIGS. 21(a) and (b) are cut along the cutting-plane lines X—X. A through-hole 543 is provided in the central portion of the lower surface adapter 541, and an annular recessed floor 544 for accommodating the flexible optical disk 200 is provided thereon. A through-hole 545 is formed also in the central portion of the upper surface adapter 542. A plurality of resilient holding pawls 546a are provided along the outer circumferential portion of the upper surface adapter 542. They are fitted into fitting grooves 546b provided along the outer circumferential portion of the lower surface adapter 541. Such a fitting state is best shown in FIG. 21(c). By mounting the flexible optical disk 200 on the annular recessed floor on the lower surface adapter 541 to fit the upper surface adapter 542 from thereon, the flexible optical disk can be held therebetween.

(5) An embodiment shown in FIG. 22 is such that the flexible optical disk 200 is held by lower and upper surface adapters 551 and 552. FIG. 22(a) is a plane view, FIG. 22(b) is a side cross-sectional view when the adapter shown in FIG. 22(a) is cut along the cutting-plane lines X—X, and FIG. 22(c) is an enlarged view of the upper surface adapter 552 in FIG. 22(b). A through-hole 553 is provided in the lower surface adapter 551 and a through-hole 554 is provided in the upper surface adapter 552. The upper surface adapter 552 is designed so that its radius is considerably smaller than that of the lower surface adapter 551. A screwed surface 555b is formed on the outer circumferential surface thereof. This screwed surface 555b is screw-threadedly connected to the screwed surface 555a formed on the lower surface adapter 551. Accordingly, the upper surface adapter 552 is screw-threadedly connected to the central portion of the lower surface adapter 551. Holding pawls 556 are provided at a plurality of portions of the outer peripheral portion of the lower surface adapter 551. By mounting the flexible optical disk 200 on the lower surface adapter 551 to screw-threadedly connect the upper surface adapter 552 from thereon, the flexible optical disk 200 is fixed. Namely, the outer circumferential portion of the disk 200 is supported by the holding pawls 556 and the inner circumferential portion thereof is supported by a holding plate 557 of the upper surface adapter 552. FIG. 22(d) shows that a second upper surface adapter 558 is provided for fixing the outer peripheral portion of the disk 200. The second upper surface adapter 558 is annular and is screw-threadedly connected to the outer circumferential surface of the lower surface adapter 551 through the screwed surface.

Figures 23A, 23B:
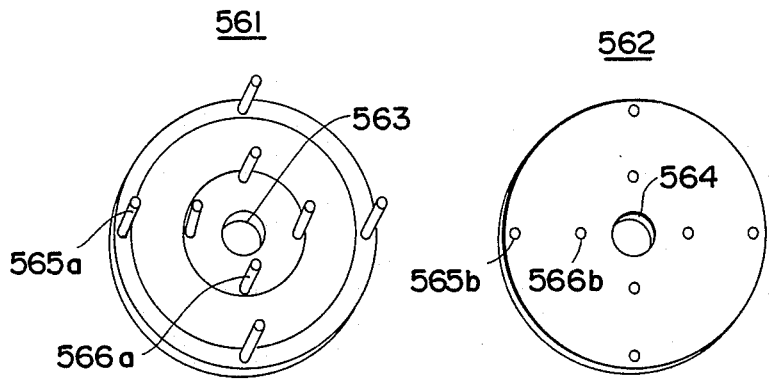

(6) An embodiment shown in FIG. 23 is such that flexible optical disk 200 is held by a lower surface adapter 561 shown in FIG. 23(a) and an upper surface adapter 562 shown in FIG. 23(b) therebetween. Through-holes 563 and 564 are formed in the lower and upper surface adapters 561 and 562, respectively. Moreover, a plurality of fitting pins 565a and 566a are provided on the lower surface adapter 561. A plurality of fitting holes 565b and 566b into which those pins are fitted are provided in the upper surface adapter 562. When the flexible optical disk 200 is mounted on the lower surface adapter 561, the outer peripheral portion thereof is supported by the fitting pins 565a from the outside, and the inner circumferential portion is supported by the fitting pins 566a from the inside. When the upper surface adapter 562 is combined with the lower surface adapter 561 so that fitting holes 565b and 566b are in correspondence with respective fitting pins, it is possible to hold the flexible optical disk 200 therebetween from both sides of the disk 200. When resilient ball-like members (not shown) having a diameter slightly larger than those of the fitting holes 565b and 566b are formed on the tip portions of the fitting pins 565a and 566a, the flexible optical disk 200 can be held with both the adapters being combined with each other.

Figure 24:
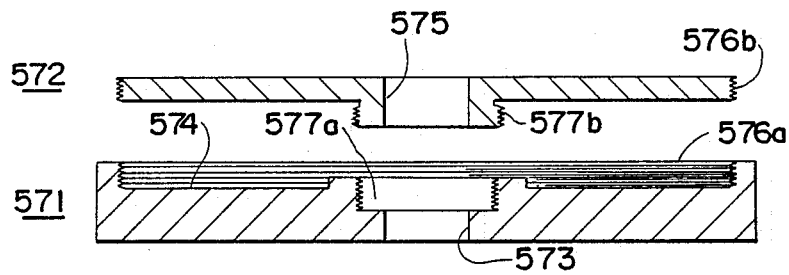

(7) An embodiment of which cross-sectional is shown in FIG. 24 is such that lower and upper surface adapters 571 and 572 are screw-threadedly connected, thereby holding the flexible optical disk 200 therebetween. A through-hole 573 is provided in the central portion of the lower surface adapter 571, and an annular recessed floor 574 for accommodating the flexible optical disk 200 is provided around the through-hole 573. A through-hole 575 is provided in the central portion of the upper surface adapter 572. A screwed surface 576a is formed on the inner surface of the wall around the lower surface adapter 511, and a screwed surface 577a is formed on the inner surface of the wall in the central portion thereof. On the other hand, a screwed surface 576b is formed along the outer circumferential portion of the upper surface adapter 572, and a screwed surface 577b is formed on the outer surface of the wall in the center thereof. These screwed surfaces 576a and 576b are screw-threadedly connected and these screwed surfaces 577a and 577b are screw-threadedly connected. Accordingly, by mounting the flexible optical disk 200 on the annular recessed floor 574 of the lower surface adapter 571 to screw-threadedly connect the upper surface adapter 572 thereto from the upward direction, the flexible optical disk 200 can be held therebetween from both the sides thereof.

Figure 25:
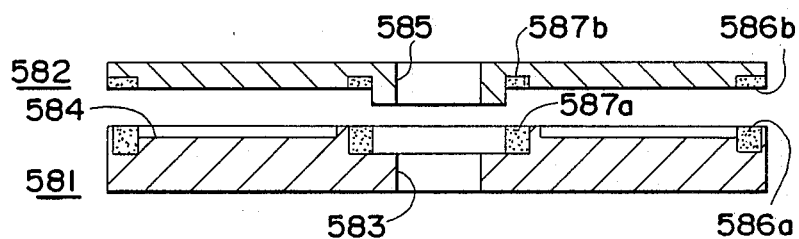

(8) An embodiment of which cross-sectional is shown in FIG. 25 is such that a lower surface adapter 581 and an upper surface adapter 582 are magnetically joined, thereby holding the flexible optical disk 200 therebetween. A through-hole 583 is provided in the central portion of the lower surface adapter 581, and an annular recessed floor 584 for accommodating the flexible optical disk 200 is provided around the through-hole 583. Moreover, a through-hole 585 is provided in the central portion of the upper surface adapter 582. A magnet 586a is embedded along the outer circumference of the lower surface adapter 581, and a magnet 587a is embedded along the inner circumference in the central portion thereof. On the other hand, a magnet 586b is embedded along the outer circumference of the upper surface adapter 582, and a magnet 587b is embedded along the inner circumference in the center thereof. The magnets 586a and 586b are magnetically joined and the magnets 587a and 587b are also magnetically joined. Accordingly, by mounting the flexible optical disk 200 on the annular recessed floor 584 of the lower surface adapter 581 to magnetically join the upper surface adapter 582 thereto from the upward direction, the flexible optical disk 200 can be held therebetween.

(g) It has been exemplified that the flexible optical disk 200 is held by the adapters therebetween. In addition, adhesive material may be painted on one side of the flexible optical disk 200 to adhere it to the adapters by using the adhesive material.

5.3 Advantages

As just described above, since the reproduction of the flexible optical disk is conducted by utilizing the adapter, reliable reading of data which is not influenced by dust, etc. is enabled. Moreover, by fitting adapters over the flexible optical disk, the external form of the flexible optical disk can be identical to that of the optical disk on the market, with the result that reproduction can be conducted using ordinary reproducing equipment on the market. Further, since it is possible to freely exchange flexible optical disks to be fitted with the adapters, when one set of adapters are prepared, reproduction of various flexible optical disks can be conducted.

§6 Method of manufacturing ordinary optical disk

While the flexible optical disks have been described, such flexible optical disks are applicable to manufacturing of ordinary optical disks (thick disks having no flexibility). As stated in §5, by placing adapters on the flexible optical disk, it is possible to handle it as a disk having the same thickness as that of an ordinary optical disk. Thus, by adhering the flexible optical disk to the adapters, it is possible to manufacture a disk having completely the same function as that of an ordinary optical disk.

6.1 First embodiment

Figure 26:
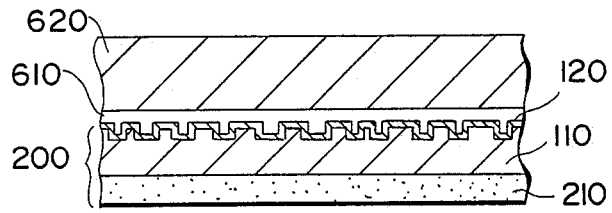
FIGS. 26 to 28 are views showing the principle of a process for manufacturing an optical information recording medium having an ordinary thickness by making use of a flexible optical information recording medium according to this invention.

FIG. 26 is a side cross-sectional view of an embodiment in which an ordinary optical disk is thus formed. A portion to which reference numeral 200 is attached has a structure equivalent to the flexible optical disk 200 shown in FIG. 4, which comprises supporting layer 210, resin layer 110, and reflection layer 120. An adhesive layer 610 is formed on such a flexible optical disk 200 and is adhered to a base plate layer 620. In this figure, for the sake of convenience, an indication is made such that a ratio between respective layers is different from an actual one. Actually, the flexible optical disk has a thickness of the order of 100 $\mu$m as previously described, whereas the base plate layer 620 is very thick to such an extent that its thickness is 1.2 mm. The entire thickness becomes equal to approximately 1.2 mm, which is equivalent to that of optical disks on the market. Such an optical disk has no longer has flexibility.

For base plate layer 620, any transparent material may be used. For example, cast molded plate of acrylic resin may be used. For adhesive layer 610, a transparent adhesive generally used may be used and its thickness is preferably 1 to 10 $\mu$m.

6.2 Second embodiment

Figure 27:
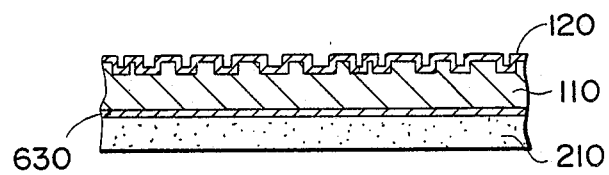
Figure 28:
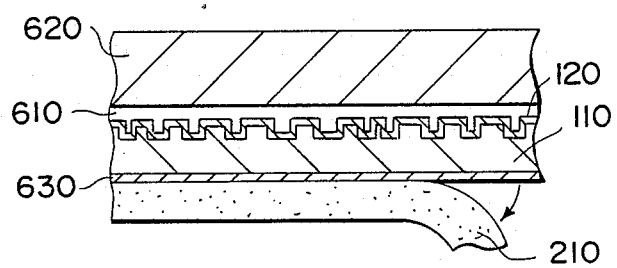

The supporting layer 210 is comprised of a plastic resin such as polyethylene terephthalate. In the case of use for an ordinary optical disk, this supporting layer 210 is not required. Thus, this supporting layer 210 may be exfoliated and removed later. To realize this, it is sufficient to form an exfoliation layer between the supporting layer 210 and the resin layer 110 at a process for manufacturing the flexible optical disk as shown in FIG. 27. If such an exfoliation layer 630 is formed, after the flexible optical disk is adhered to the base plate layer 620 through the adhesive layer 610, the supporting layer 210 may be exfoliated as shown in FIG. 28.

For the exfoliation layer, general material having exfoliating effect may be used. It is suitable that its thickness is 0.5 to 2 $\mu$m. This exfoliation layer 630 serves to protect the resin layer 110 after the supporting layer 210 is exfoliated.

6.3 Advantages

As just described, a method of first manufacturing a flexible optical disk to adhere it onto the base plate layer, to thus provide an ordinary optical disk is greatly significant in reducing the manufacturing cost of the optical disk. Namely, conventional optical disks have been manufactured one by one in accordance with the injection method or compression method to inject plastic resin into a metal mold on which an uneven pattern is formed. Further, even in the case of using a photosensitive resin, since they are integrally molded on a rigid supporting body, they are to be manufactured one by one. In contrast, the method of continuously flexible optical disks in accordance with the process described in §3, 4 makes it easy to mass-produce them with very high efficiency. Accordingly, the method of manufacturing flexible optical disks suitable for mass production to adhere them onto the base plate layer, to thus manufacture ordinary optical disks is more efficient as compared to the method of manufacturing optical disks by the above-mentioned conventional process, and is suitable for mass production. In accordance with this method, it is expected that the manufacturing cost can be reduced to approximately one-tenth of that of the conventional method.

Industrial Applicability

A flexible optical information recording medium according to this invention can be utilized for a recording medium for music, images, and/or data, etc. in the form of a thin compact disk (CD) for digital audio, a thin video disk, and a thin CD-ROM. Since this medium is a thin medium having flexibility, it is excellent in carrying ability and a wide variety of manners of setting can be realized. In addition, for commercial utilization manner, the following manners of special utilization are possible.

(1) Such recording media sell being attached to books. Namely, since this recording medium is a thin disk having flexibility, an accommodating pocket is provided at a back cover etc. of the book to sell the book with the disk being accommodated into the accommodating pocket. Information indicating the description of the content of the book by voice or pictorial image is recorded in the disk. Users can utilize the information in the disk as well as the information described on respective pages of the book.

(2) Such recording media sell being attached to computer related magazines. This is one of the utilization manners in which recording media sell with they being attached to books. By attaching them to particularly computer related magazines, the utilization as the thin CD-ROM can be expanded. In this case, programs or digital data for computers can be recorded in the disk. Ordinarily, users input programs or digital data introduced in the magazines to the computers while looking at program list or dump lists appearing in magazines. If such CD-ROM is attached to the magazine, users can immediately obtain necessary program or digital data by reading out the data in the CD-ROM.

(3) Such recording media are utilized for direct mail as the disk for introduction of goods. Images introducing goods are recorded in the form of video disk to forward them to customers as direct mails. Since such recording media have flexibility and are of thin type, they are suitable for mailing and postage can be reduced. In addition, since customers can confirm goods in the form of an image, they can purchase them without entertaining apprehensions about goods or having distrust thereof.

(4) Such recording media are attached to instruction manuals for goods. The functions of recent electric products, machinery products and automotive vehicles, etc. have become increasingly complicated, and therefore instruction manuals on which how to deal with respective products is described become complicated accordingly. Accordingly, by attaching a disk for explaining how to deal with products to the instruction manual by voice or pictorial image, users can utilize information in the disk as well as the instruction manual.

(5) Such recording media are utilized as video disks for advice of a movie. Images of trailer for several new films are recorded in the disk to distribute them to general viewers. Because of thin disks having flexibility, distribution can be easily carried out. Viewers can repeatedly appreciate the trailer, resulting in a high advertising effect.

What is claimed is:

1. An adapter for use in reproduction of a flexible optical information recording medium, on which digital information is recorded as an uneven pattern corresponding thereto, said adapter being used when a read beam is irradiated to said medium, characterized by the provision of a lower surface adapter (511; 521; 531; 541; 551; 561; 571; 581) for supporting the lower surface of said flexible optical information recording medium, an upper surface adapter (512; 522; 532; 542; 552; 562; 572; 582) for supporting the upper surface thereof, and connection means (516, 517; 526, 527; 535, 539; 546; 555, 556; 565, 566; 576, 577; 586, 587) for connecting said both adapter so as to enable said upper surface adapter and said lower surface adapter to hold said flexible optical information recording medium therebetween.

2. An adapter for use in reproduction of a flexible optical information recording medium as set forth in claim 1, wherein said connection means is comprised of a holding pawl (516a, 517a), and a cut groove (516c, 517c) into which said holding pawl is fitted.

3. An adapter for use in reproduction of a flexible optical information recording medium as set forth in claim 1, wherein said connection means is comprised of a hinge (527).

4. An adapter for use in reproduction of a flexible optical, information recording medium as set forth in claim 1, wherein said connection means is comprised of a screw (535; 555; 576, 577).

5. An adapter for use in reproduction of a flexible optical information recording medium as set forth in claim 1, wherein said connection means is comprised of a resilient holding pawl (546a), and a fitting groove (546b) into which said holding pawl is fitted.

6. An adapter for use in reproduction of a flexible optical, information recording medium as set forth in claim 1, wherein said connection means is comprised of a fitting pin (565a, 566a), and a fitting hole (565b, 566b) into which said fitting pin is fitted.

7. An adapter for use in reproduction of a flexible optical, information recording medium as set forth in claim 1, wherein said connection means is comprised of a magnet (586, 587).

8. A method utilizing an original block on which an uneven pattern corresponding to digital information to be recorded is formed, the uneven pattern of the original block being transferred and molded to thereby manufacture a flexible optical information recording medium, the method comprising the steps of:

filling a resin liquid, which can be hardened by irradiation of ultraviolet or electron rays, between a base film, through which said rays are transmissible, and the original block at a position immediately in front of a carrying roller guiding said base film, wherein a surface of said base film and a surface of the original block face each other;

irradiating said rays through said base film to harden and give form to said resin liquid on said base film; and exfoliating said base film and a resin layer, formed by said hardened resin liquid on said base film, from the original block.

9. The method of claim 8, wherein said resin liquid comprises a prepolymer or oligomer monomer having an unsaturated molecular bond.

10. The method of claim 8, wherein the original block is formed by an exposure process using a photoresist.

11. The method of claim 8, wherein the original block is a mold comprised of resin.

12. The method of claim 8, wherein said base film comprises a polymerized film.

13. An apparatus utilizing an original block on which an uneven pattern corresponding to digital information to be recorded is formed, the uneven pattern of the original block being transferred and molded to thereby manufacture a flexible optical information recording medium, the apparatus comprising:

film supply means for supplying a wound base film through which ultraviolet or electron rays are transmissible;

a replica cylinder on which the original block is fitted such that the uneven pattern is exposed at an outer circumferential surface thereof;

pressing means for pressing said base film supplied from said film supply means onto said outer circumferential surface with a pressure of more than 1 kg/cm$^2$;

resin liquid adhesion means provided at a position spaced in a direction opposite to a revolving direction of said replica cylinder with respect to a pressing position of said pressing means, for allowing a resin liquid, which can be hardened by irradiation of said rays, to be adhered onto the uneven pattern surface of the original block;

irradiation means provided at a position spaced int he revolving direction of said replica cylinder with respect to said pressing position, for irradiating said rays to said resin liquid through said base film;

exfoliation means for exfoliating said base film and a resin layer hardened thereon from the original block, said base film and said resin layer being exfoliated after form is given to said resin liquid and said resin liquid is hardened on said base film by irradiation emitted by said irradiation means, to thereby form said resin layer; and winding means for winding said base film and said resin layer which have been exfoliated.

14. The apparatus of claim 13, wherein said film supply means comprises a winding roll and a feed roller.

15. The apparatus of claim 13, wherein said pressing means comprises a nip roller.

16. The apparatus of claim 13, wherein said irradiation means is movable is a forward and a backward position with respect to said exfoliation means, along a pass of said base film.

17. The apparatus of claim 13, wherein said exfoliation means comprises a feed roller for introducing said base film in a direction different from a revolving direction of said replica cylinder.

18. A method utilizing an original block on which an uneven pattern corresponding to digital information to be recorded is formed, the uneven pattern of the original block being transferred and molded to thereby manufacture a flexible optical information recording medium the method comprising the steps of;

forming a resin layer onto a roller base film through which ultraviolet or electron rays are transmissible, thus forming a rolled transfer film, wherein said resin of said layer is hardenable by irradiation o f said rays and has thermal moldability;

pressure-welding a surface of said resin layer of said transfer film onto a surface of the original block on which the uneven pattern is formed, while softening said resin layer by heating, so as to transfer the uneven pattern from the original block to said resin layer;

irradiating said rays through said base film to thereby harden said softened resin layer; and exfoliating said transfer film, into which the uneven pattern has been completely transferred, from the original block.

19. The method of claim 18, wherein said resin layer comprises a compound having a radical polymerization unsaturated group in a polymer of which the glass transition temperature is 0 to 260° C.

20. The method of claim 18, wherein said resin layer comprises a compound having a melting point of 0 to 250° C. and a radical polymerization unsaturated group.

21. The method of claim 18, wherein the original block is formed by an exposure process using a photoresist.

22. The method of claim 18, wherein the original block is a mold comprised of resin.

23. The method of claim 18, wherein said base film is comprised of a polymerized film.

24. The method of claim 18, wherein said rolled transfer film comprises a base film, a resin layer and a reflection layer formed thereon.

25. An apparatus utilizing an original block on which an uneven pattern corresponding to digital information to be recorded is formed, the uneven pattern of the original block being transferred and molded to thereby manufacture a flexible optical information recording medium, the apparatus comprising:

film supply means for supplying a wound transfer film which comprises a base film through which ultraviolet or electron rays are transmissible and a resin layer formed thereon, said resin layer consisting of a resin which can be hardened by irradiation of said rays and has thermal moldability;

a replica cylinder on which the original block is fitted so that the uneven pattern is exposed at an outer circumferential surface thereof, said replica cylinder rotationally moving in a predetermined direction;

transfer means for pressure-welding said transfer film supplied from said film supply means onto the uneven pattern surface of the original block fitted on said replica cylinder, so that a resin layer surface of said transfer film is in contact with a surface of the uneven pattern, and transferring the uneven pattern while heating said resin layer to thereby soften said resin layer;

irradiation means for irradiating said rays through said base film to harden said softened resin layer;

exfoliation means for exfoliating said transfer film, to which the uneven pattern has been completely transferred, from the original block; and winding means for winding said exfoliated transfer film.

26. The apparatus of claim 25, wherein said film supply means comprises a rotatable winding roller and a power brake for controlling the revolution of said winding roller.

27. The apparatus of claim 26, said transfer means further comprising a pressing roller for pressing said transfer film onto said replica cylinder, a pressure application means for engaging said pressing roller, and a heating unit for heating said transfer film.

28. The apparatus of claim 27, wherein said heating unit is incorporated into said pressing roller.

29. The apparatus of claim 27, wherein said heating unit is incorporate into said replica cylinder.

30. The apparatus of claim 25, said exfoliation means further comprising a guide roller for guiding said base film in a different revolving direction than that of said replica cylinder.

31. A method of reproducing a flexible optical information recording medium on which digital information is recorded as an uneven pattern corresponding thereto, by irradiating a read beam to the medium, comprising:

contacting a flat plate-like adapter of a transparent rigid material with a surface of a flexible recording medium to which at least the read beam is irradiated, to thereby irradiate the read beam to said flexible medium through said adapter.

32. The method of claim 31, wherein said adapter and the medium have substantially the same shape.

33. The method of claim 32, wherein the thickness of the medium is 1.2 to 1.5 mm.

34. A method utilizing an original block on which an uneven pattern corresponding to digital information to be recorded is formed, the uneven pattern of the original block being transferred and molded to thereby manufacture a flexible optical information recording medium final product, the method comprising the steps of:

manufacturing a medium which is flexible and much thinner than the final product thickness; and adhering a transparent, rigid flat plate having a thickness approximately the same as the final product, to at least a surface of said flexible medium on which information is read, to thereby form the final product.

35. The method of claim 34, wherein the thickness of the final product is 1.2 to 1.5 mm.

36. The method of claim 34, wherein said flexible medium and said flat plate are adhered together by an adhesive layer.

* * * * *